United States Patent [19]
Nakashima et al.

[11] Patent Number: 5,875,247
[45] Date of Patent: Feb. 23, 1999

[54] SYSTEM FOR DECRYPTING ENCRYPTED SOFTWARE

[75] Inventors: Kazuo Nakashima; Masaru Nakahara; Satoshi Itami; Kenichi Utsumi, all of Kawasaki, Japan

[73] Assignee: Fujitsu Limited, Kawasaki, Japan

[21] Appl. No.: 510,123

[22] Filed: Aug. 1, 1995

[30] Foreign Application Priority Data

Sep. 9, 1994 [JP] Japan ................................ 6-216450

[51] Int. Cl.⁶ ........................................................ H04L 9/00
[52] U.S. Cl. .................... 380/4; 380/21; 380/23; 380/25; 380/44; 380/46; 380/49; 380/50
[58] Field of Search .................................. 370/4, 20, 21, 370/23, 25, 44, 46, 49, 50, 29, 9

[56] References Cited

U.S. PATENT DOCUMENTS

| | | |
|---|---|---|
| 4,247,106 | 1/1981 | Jeffers et al. . |
| 4,439,670 | 3/1984 | Basset et al. . |
| 4,446,519 | 5/1984 | Thomas . |
| 4,484,217 | 11/1984 | Block et al. . |
| 4,558,176 | 12/1985 | Arnold et al. . |
| 4,590,557 | 5/1986 | Lillie . |
| 4,646,234 | 2/1987 | Tolman et al. . |
| 4,649,510 | 3/1987 | Schmidt . |
| 4,654,799 | 3/1987 | Ogaki et al. . |
| 4,658,093 | 4/1987 | Hellman . |
| 4,672,554 | 6/1987 | Ogaki . |
| 4,674,055 | 6/1987 | Ogaki et al. . |
| 4,740,890 | 4/1988 | William . |
| 4,780,905 | 10/1988 | Cruts et al. . |
| 4,787,050 | 11/1988 | Suzuki . |
| 4,816,653 | 3/1989 | Anderl et al. . |
| 4,816,654 | 3/1989 | Anderl et al. . |
| 4,817,140 | 3/1989 | Chandra et al. . |
| 4,864,516 | 9/1989 | Gaither et al. . |
| 4,879,645 | 11/1989 | Tamada et al. . |
| 4,949,257 | 8/1990 | Orbach . |
| 4,999,806 | 3/1991 | Chernow et al. . |
| 5,006,849 | 4/1991 | Baarman et al. . |
| 5,008,814 | 4/1991 | Mathur . |
| 5,014,234 | 5/1991 | Edwards, Jr. . |
| 5,016,009 | 5/1991 | Whiting et al. . |
| 5,051,822 | 9/1991 | Rhoades . |
| 5,056,009 | 10/1991 | Mizuta . |
| 5,103,392 | 4/1992 | Mori . |
| 5,103,476 | 4/1992 | Waite et al. . |
| 5,151,938 | 9/1992 | Griffin, III et al. ................... 380/25 X |
| 5,166,886 | 11/1992 | Molnar et al. . |
| 5,181,107 | 1/1993 | Rhoades . |
| 5,199,066 | 3/1993 | Logan . |
| 5,214,697 | 5/1993 | Saito . |
| 5,222,134 | 6/1993 | Waite et al. . |
| 5,245,330 | 9/1993 | Wassink . |
| 5,267,171 | 11/1993 | Suzuki et al. . |
| 5,268,962 | 12/1993 | Abadi et al. ............................. 380/21 |

FOREIGN PATENT DOCUMENTS

| | | |
|---|---|---|
| 57-127249 | 8/1982 | Japan . |
| 5-89363 | 4/1993 | Japan . |
| 5-266575 | 10/1993 | Japan . |
| 5-298085 | 11/1993 | Japan . |
| 6-95871 | 4/1994 | Japan . |

*Primary Examiner*—Bernarr E. Gregory
*Attorney, Agent, or Firm*—Staas & Halsey

[57] ABSTRACT

A CD-ROM stores encrypted software. When a user desires to decrypt and install this software, an approval preparatory key is generated by an installer. This approval preparatory key is generated based on time data. When the user informs a center of this approval preparatory key, the center calculates a difference between this approval preparatory key and a decrypting key and vends this calculated result to a user in the form of an approval key. When the user inputs this approval key to an installer, the installer generates a decrypting key by adding the approval preparatory key to the approval key. The installer decrypts the software by this decrypting key and installs the encrypted software into a personal computer system.

27 Claims, 27 Drawing Sheets

| MINUTE 2 | YEAR 1 | YEAR 4 | HOUR 1 | YEAR 3 | DATE 2 | MONTH 1 | ※ |

| YEAR 2 | MINUTE 1 | SECOND 2 | DATE 1 | MONTH 2 | HOUR 2 | SECOND 1 | ※ |

FIG. 10

| 4 | 1 | 4 | 1 | 9 | 6 | 0 | 8 | 9 | 3 | 6 | 2 | 7 | 2 | 5 | 5 |

FIG. 11

| 6 | 9 | 6 | 9 | 1 | 4 | 0 | 2 | 1 | 7 | 4 | 8 | 3 | 8 | 5 | 5 |

FIG. 12

| 5 | 1 | 4 | 2 | 9 | 0 | 0 | 5 | 9 | 4 | 1 | 3 | 7 | 3 | 0 | 6 |

FIG. 13

| 1 | 0 | 0 | 1 | 0 | 4 | 0 | 7 | 0 | 1 | 5 | 1 | 0 | 1 | 5 | 1 |

FIG. 32

| NUMBER OF TIME | NUMBER OF TIME | NAME OF SOFTWARE | NAME OF SOFTWARE | NAME OF SOFTWARE | HOUR 1 | HOUR 2 |

| MINUTE 1 | MINUTE 2 | SECOND 1 | SECOND 2 | ※ | ※ | ※ | ※ |

SYSTEM FOR DECRYPTING ENCRYPTED SOFTWARE

BACKGROUND OF THE INVENTION

1. Field of the Invention

The present invention relates to a system for decrypting software which was distributed in encrypted state.

2. Description of the Prior Art

In recent years, with a spread of a CD-ROM drive, a distribution of the encrypted software using a CD-ROM as a medium is popular. This is derived from the fact that the CD-ROM medium can be manufactured at an extremely low cost and has a large capacity over 600 MB, and the CD-ROM drive becomes lower in price but higher in speed. Further, the CD-ROM is light and thin and can be therefore distributed while being inset in a magazine. This distribution mode is a novel mode that could not be seen in a distribution of the software using a floppy disk as a medium.

On the other hand, the software stored in this CD-ROM is digital data and therefore has a risk of being easily illegally copied and installed. The term "install" is to load the software into a disk device (hard disk, a silicon disk, etc.) of a personal computer system. Hence, it is required that there also be established a system capable of preventing such illegal copying and installing on the distribution of the software by use of the CD-ROM.

Proposed under such circumstances was a software distribution system for distributing the software by use of the CD-ROM while preventing the illegal copying and installing.

For example, as illustrated in FIG. 39, there has been utilized a software distribution system in which plural kinds of practical version encrypted software and trial version non-encrypted software corresponding thereto are recorded on a single piece of CD-ROM, and this CD-ROM is distributed.

According to this system, a user 100 at first purchases a CD-ROM which stores the above contents from a sales shop 101 (the sales price of the CD-ROM is set comparatively low). Then, the user 100 tries the trial version software stored in the CD-ROM. This trial version software is, however, in the majority of cases, restricted functions such as being incapable of file storage and printing, etc. If there is software that the user wants to get as a result of a trial use of the trial version software, the user installs practical version software corresponding thereto into a personal computer system of the user's own.

The practical version software has been, however, encrypted, and it is therefore required that a decrypting key for decrypting the ciphers is inputted when the practical version software is installed. For this purpose, the user gets a contact with a management center (hereinafter referred to simply as a "center") 102 to which a work of setting a right of use is entrusted from a software rightful claimant (person possessed of copyright or the right of use) through a telephone or the like and thus makes a request for purchasing the decrypting key for the software. The center 102, on confirming a payment of money necessary for purchasing the decrypting key, vends and offers it to the user 100. The user 100 is allowed to decrypt the practical version software by inputting the decrypting key and thus can complete the installation.

According to this system, however, the decrypting key can be, as a matter of fact, used again and again. It is therefore possible to matter-of-factly install the decrypting key into a plurality of personal computer systems. Further, in fact, the user 100 can tell the decrypting key purchased a third party having no right and let them decrypt and install the practical version software. Those are illegal using conducts beyond the range allowed by an approval contract for using the software when the decrypting key is vended. A fist problem inherent in a conventional software decrypting system is that those illegal uses can not be effectively prevented.

Also, if a decrypting key which is effective only once with some methods is developed, the illegal use given as the first problem could be prevented. On the other hand, however, the following problems will arise. That is, even the user 100 set the right of use of the software by regularly purchasing the decrypting key wants to reinstall if some of files constituting the software are broken down or if drive setting (mapping) of the disk device is changed. Further, when this regular user 100 newly purchases a personal computer system, the user desires to delete (uninstall) a certain set of software installed in the previous personal computer system and to reinstall it into the new personal computer system as the case may be. Such reinstalling is normally a conduct falling within the range of the right of use of the software. Then, for executing the above valid reinstalling, the regular user 100 has to set the decrypting key once again. However, since the decrypting key purchased at first has already been used, it follows that the user 100 requests the center 102 for a free-of-charge distribution of the decrypting key.

The center 102 can not, however, distinguish whether the decrypting key requested by the user 100 intends the reinstalling or an illegal use such as informing the third party of the decrypting key. For this reason, the center 102 can not take measures such as offering the decrypting key which is free of charge in response to the request for reinstalling but rejecting the request for the illegal use as in the case of providing the decrypting key to the third party or demanding a running royalty for the decrypting key. This is a second problem inherent in the conventional software decrypting system.

SUMMARY OF THE INVENTION

It is a first object of the present invention, which was devised in view of the first problem given above, to provide a software decrypting system capable of effectively preventing an illegal use of encrypted software stored in a CD-ROM.

It is a second object of the present invention, which was devised in view of the second problem given above, to provide a software decrypting system capable of reissuing a decrypting key for decrypting the encrypted software stored in the CD-ROM in response to only a valid request by distinguishing a valid request from the illegal request.

To obviate the first problem, a software decrypting system according to the present invention is constructed of a decrypting device for decrypting encrypted software by use of a decrypting key and a management device for managing the decryption of the software. The software decrypting system comprises a first key generating means, provided in decrypting device, for generating a first key on the basis of time data and a second key generating means, provided in the management device, for generating a second key by performing a first arithmetic operation on the decrypting key and the first key. This system also comprises a decrypting key generating means, provided in the decrypting device, for generating the decrypting key by effecting a backward calculation of the first arithmetic operation on the first key and the second key and a decrypting means, provided in the decrypting device, for decrypting the encrypted software by use of the decrypting key.

The decrypting device may be incorporated into a computer system such as a personal computer system or may be constructed as an external device thereof.

The management device performs a management of whether the software may have been decrypted or not. This management device may be connected online to the decrypting device or may be operated by an operator. In the latter case, the operator of the management device and an operator may contact directly or through telephone for transferring and receiving the first key and the second key.

The first key generating means generates the first key from time data. This time data may be composed of only one item of date, hour, minute and second or of an arbitrary combination thereof. In the case of the combination, however, it is desirable that consecutive unit elements are combined. The first key generating means may make the first key containing data about kinds of the software or containing data about random numbers or containing data about a number of installations.

The second key generating means generates the second key by performing the first arithmetic operation on the first key and the decrypting key. This first arithmetic operation may be an operation of taking a difference between the two keys or an operation of adding the two keys or other operations.

The decrypting key generating means may store the second key after generating the decrypting key.

The management device may include an accounting means for imposing a running royalty of the software each time the second key generating means generates the second key. If constructed in this way, it is possible to impose a running royalty corresponding to the number of decryptions. This accounting means can be constructed so as not to impose the running royalty of the software even when the second key generating means regenerates the second key in case the software decrypted by the decrypting device is deleted from a storage device of the personal computer. Because, if the software is deleted therefrom, this can be conceived as mere reinstalling of the software, and it is therefore rational to impose no running royalty.

A storage means installed with the decrypted software may be connected to the decrypting device, and this decrypting device may include an installing means for installing the software decrypted by the decrypting means into the storage means. If constructed in this manner, the system is capable of making the accounting means manage the number-of-installations itself.

The decrypting device may include an uninstalling means for deleting the software installed into the storage device. With this construction, it is feasible to surely detect the deletion of the software from the storage device.

The decrypting device may include a third key generating means for generating a third key for proving, when the uninstalling means deletes the software from the storage device, this effect. With this construction, the management device can be informed of the third key and hence surely informed of the deletion of the software. In this case, the third key generating means may generate the third key by performing a second arithmetic operation on the second key. With this operation, the third key can be related to the first key for the first installation.

Further, when the third key generating means generates the third key, the second key generating means may generate the second key by performing the first arithmetic operation on the decrypting key and the third key. In this case, the decrypting key generating means may generate the decrypting key by performing a backward calculation of the first arithmetic operation on the basis of the third key and this second key. With this processing, the decrypting key generating means is capable of generating the decrypting key without being aware of the type of the key generated by the first key generating means.

The management device may include a storage means for storing all of the first keys and the third keys that have been targets for the first arithmetic operation by the second key generating means. In this case, the second key generating means may be constructed so as not to perform the above arithmetic operation on the first key or the third key stored in the memory. Further, the management device may include a storage means for storing a first key which has been a target for the first arithmetic operation by the second key generating means and the number of times with which the second key is generated. In this case, the second key generating means may be constructed to generate the second key only when the third key coincide with a result of executing the first and second arithmetic operations the above number of times with respect to the first key stored in the storage means. With these constructions, the management device can grasp an install history. Accordingly, even when reinstalled or installed into other computer system, the management means is capable of accurately recognizing these installations. Hence, it is possible to distinguish the valid request for reissuing the decrypting key from the illegal request for issuing the decrypting key of the encrypted software stored in the CD-ROM and also to reissue the decrypting key in response to only the valid request for reissuing the decrypting key.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a diagram showing an example of a decrypting key used in the first embodiment of the present invention;

FIG. 9 is a diagram showing a structure of an approval preparatory key employed in the first embodiment of the present invention;

FIG. 10 is a diagram showing an example of the approval preparatory key used in the first embodiment of the present invention;

FIG. 11 is a diagram showing an example of an approval key used in the first embodiment of the present invention;

FIG. 12 is a diagram showing an example of the approval preparatory key generated in a personal computer system of a third party in the first embodiment of the present invention;

FIG. 13 is a diagram showing a decrypting key calculated from the approval key of FIG. 11 and the approval preparatory key of FIG. 12;

FIG. 32 is a diagram showing a structure of the approval preparatory key used in the fourth embodiment of the present invention;

DESCRIPTION OF THE PREFERRED EMBODIMENTS

Embodiments of the present invention will hereinafter be discussed with reference to the drawings.

Figure 1:
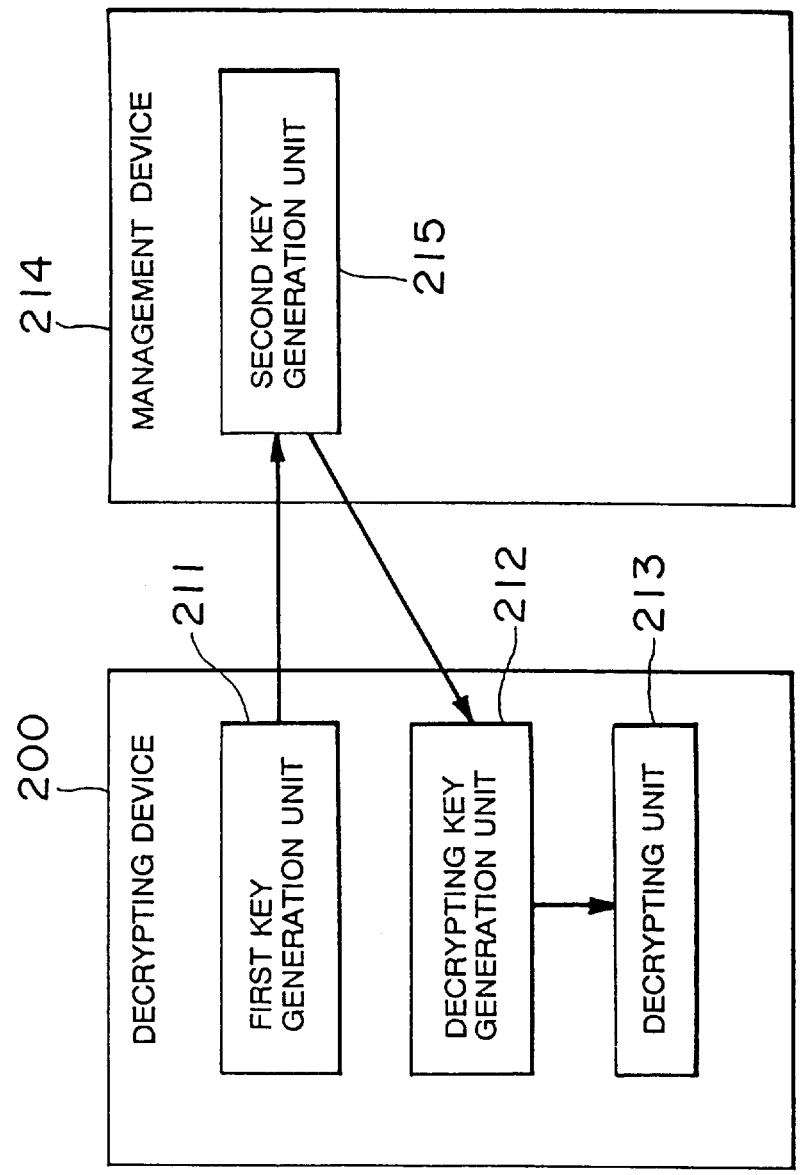
FIG. 1 is a diagram illustrating the principle of each embodiment.

To start with, there will be explained the principle common to respective embodiments, the discussions of which will be given hereinbelow. As illustrated in FIG. 1, when decrypting the encrypted software is requested by a user, a first key generation unit 211 of a decrypting device 200 generates a first key on the basis of an item of time data. A second key generation unit 215 of a management device 214 generates a second key by effecting a first arithmetic operation with respect to this first key and a decrypting key. A decrypting key generation unit 212 generates a software decrypting key by performing a backward calculation of the first arithmetic operation with respect to the first key and the second key. A decrypting unit 213 decrypts the encrypted software by use of the thus generated decrypting key. Accordingly, even when inputting the first key and a second key based on other first key generated at a different time from a generation time of the first key, the decrypting key is not generated. Hence, illegal decrypting can be prevented.

First Embodiment
<Outline of Embodiment>

Figure 2:
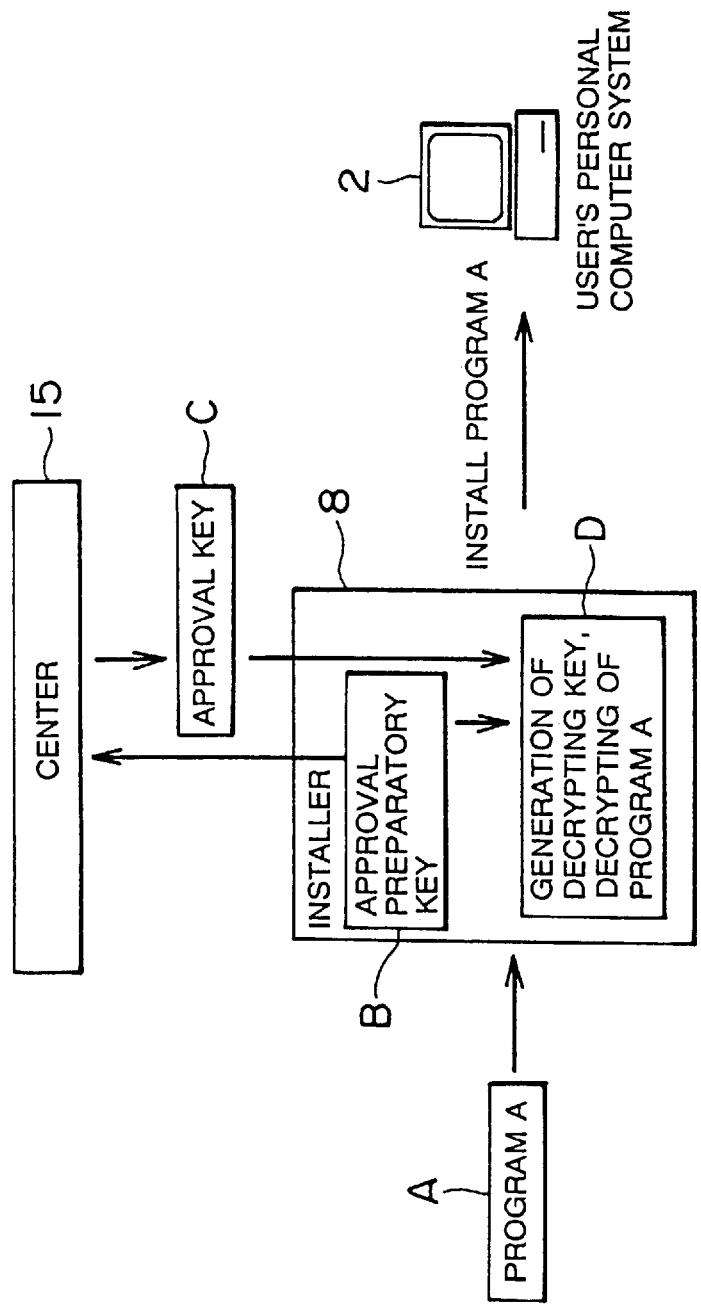
FIG. 2 is schematic diagram illustrating a software decrypting apparatus in a first embodiment of the present invention.

Shown at first is an outline of a software decrypting system in a first embodiment of the present invention. FIG. 2 illustrates a case where a user installs a program (software) on a CD-ROM 1 into a personal computer system 2. A program A is encrypted but can not be installed as it is. For the installation thereof, it is required that the encrypted program A is decrypted in an installer 8 serving as a decrypting device.

A decrypting key D for decrypting is generated from a an approval key C serving as a second key and an approval preparatory key B serving as a first key. The approval key C is generated by a center 15 serving as a management device on the basis of the approval preparatory key B generated by the installer 8 when installed. That is, if the approval preparatory key B changes, the approval key C also changes. In this way, installing the program A requires the approval key C corresponding to the approval preparatory key B generated at that time. Accordingly, the third party is unable to perform an illegal installation into a separate personal computer system 2 by misappropriating the approval key C.

Figure 3:
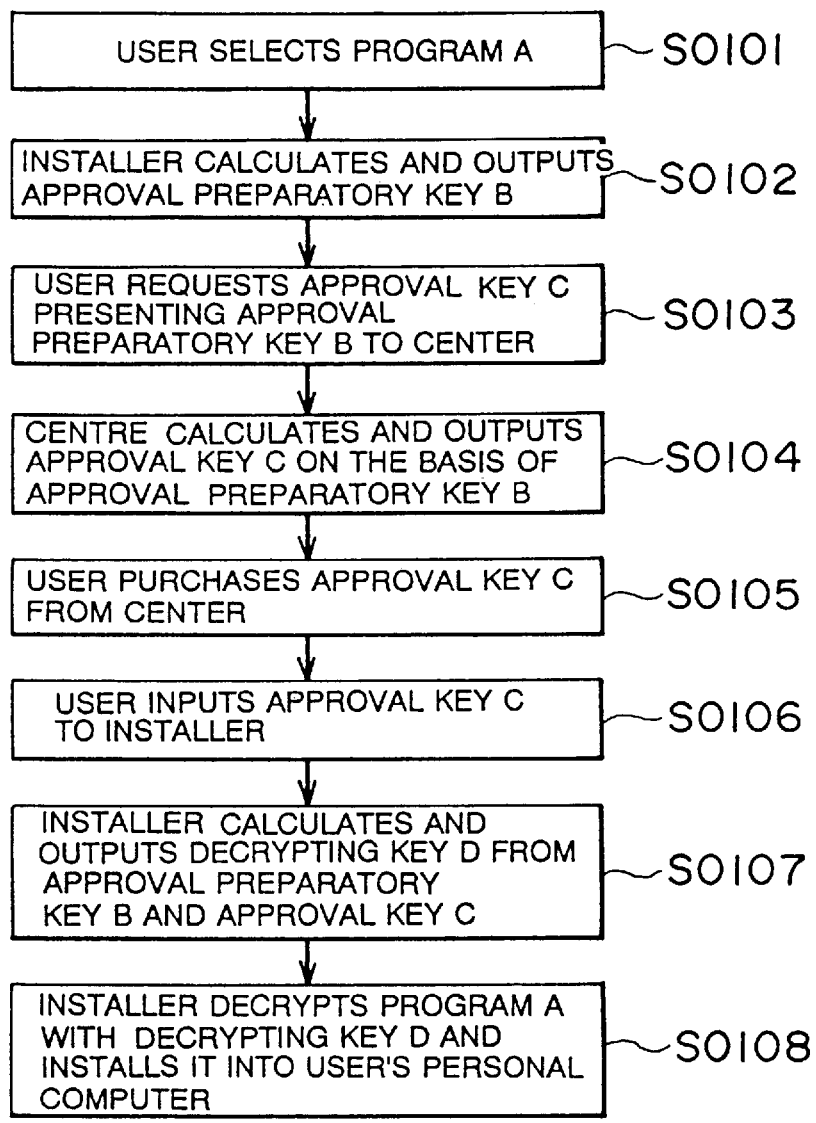
FIG. 3 is a flowchart showing an outline of processing procedures in the apparatus of FIG. 2.

FIG. 3 shows procedures of installing the software. As shown in these procedures, first, the user selects the program A from encrypted sets of software stored in the CD-ROM 1 (step S0101), and the installer 8 calculates the approval preparatory key B and outputs this approval preparatory key B (step 0102). When the user presents this approval preparatory key B to the center 15 and requests the approval key C (step S0103), the center 15 calculates the approval key C on the basis of the approval preparatory key B and outputs this approval key C (step S0104). The user purchases this approval key C (step S0105) and inputs the approval key C to the installer 8 (step S0106). The installer 8 calculates the decrypting key D on the basis of the approval preparatory key B and the approval key C and outputs this decrypting key D (step S0107). Then, the installer 8 decrypts the program A by use of the decrypting key D and installs the program A into the personal computer system (step S0108). Note that this installer 8 is, as a matter of fact, a function actualized by a control CPU 5 executing the program.

<Construction of Embodiment>

Figure 4:
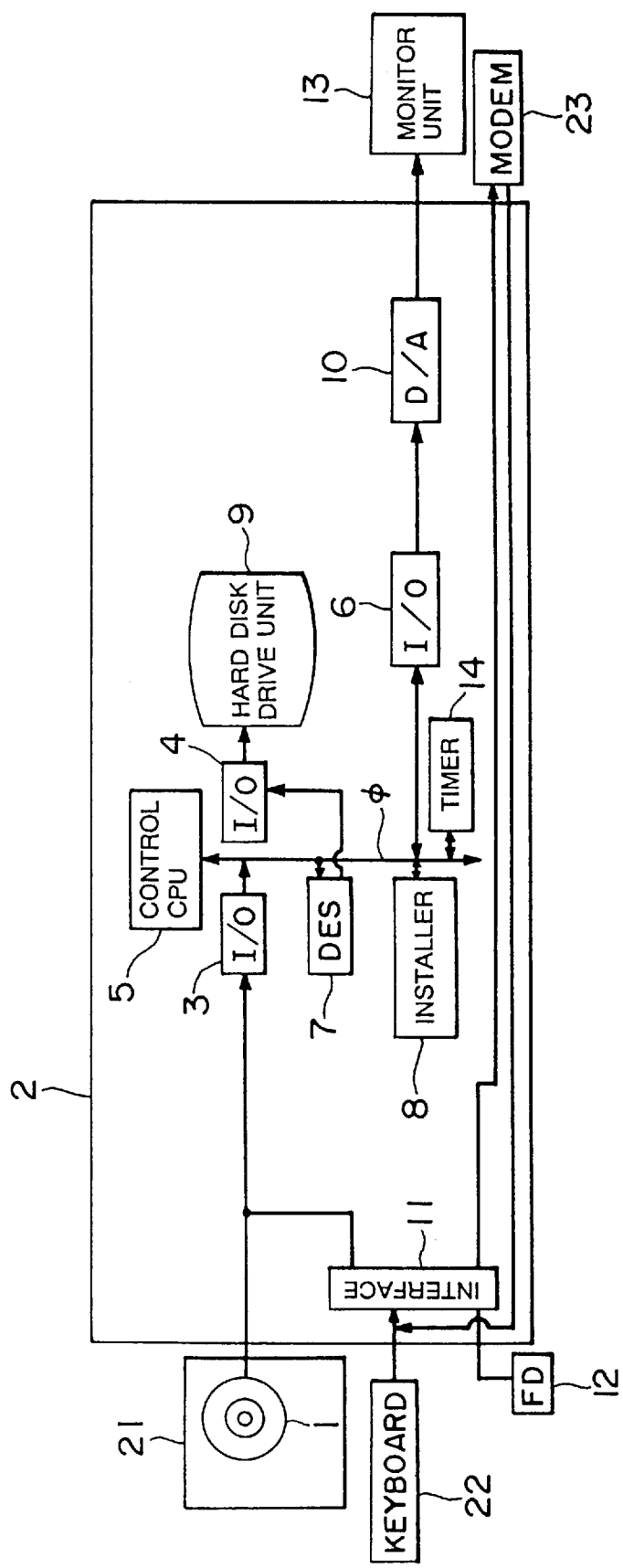
FIG. 4 is a block diagram showing a construction of a personal computer system constituting the software decrypting apparatus in the first embodiment of the present invention.

Given next is an explanation of specific constructions of the installer 8 and the center 15 that are intended to perform the control described above. FIG. 4 is a block diagram illustrating a personal computer system incorporating the above installer 8 according to the present invention. In the block diagram of FIG. 4, the function of the installer 8 is illustrated as a hardware.

In FIG. 4, stored in the CD-ROM 1 purchased by the user from a sales shop are plural kinds of software (for practical version) encrypted with a specified key and non-encrypted trial software (with some functions omitted) corresponding to the practical version software. Note that these sets of software are not necessarily programs but may be data such as, e.g., video data.

Decrypting the encrypted software entails the same key (decrypting key) as used when encrypted. Herein, it is assumed that there is used a key, all the digits of which are "0" as illustrated in FIG. 8.

A CD-ROM drive unit 21 reads these sets of software from the CD-ROM 1 storing them. The software read by the drive unit 21 is inputted via a first I/O (input-output) unit 3 to the control CPU (Central Processing Unit) 5 and a DES (Data Encryption Standard) 7.

The first I/O unit 3, the control CPU 5 and the DES 7 are connected to each other through a system bus φ. Connected also to this system bus φ are the installer 8, a second I/O unit 4, a third I/O unit 6 and a timer 14. A hard disk drive unit 9 is connected to the second I/O unit 4. Further, a monitor unit 13 is connected via a D/A (digital-to-analog) converter 10 to the third I/O unit 6. Note that an interface unit 11 is also connected to the first I/O unit 3. This interface unit 11 performs I/O processing between a keyboard 22, a floppy disk drive unit: 12, a MODEM 23 and the installer 8, which are mounted in the personal computer system 2. For example, the interface unit 11 outputs the approval preparatory key B or an uninstall key E generated by the installer 8 to the floppy disk drive unit 12 or gives a notice to the center 15 through communications via the MODEM 23. Further, the interface unit 11 inputs, to the installer 8, the approval key C inputted by the keyboard 22, the approval key C notified from the center 15 through the communications or the approval key C inputted by the floppy disk drive unit 12.

The control CPU 5 controls the whole personal computer system 2. Further, the control CPU 5 performs predetermined data processing by loading a program installed in the hard disk drive unit 9 into an unillustrated memory and then executing the program. Also, the control CPU 5 controls transferring and receiving the data between the first through third I/O units 3–6, the DES 7 and the installer 8.

The DES 7 decrypts the encrypted software received from the first I/O unit 3 in accordance with an indication given from the control CPU 5.

The installer 8 is a RAM 8 and stores programs executed by the control CPU 5 and thereby generating functions as a first key generating element, a decrypting key generating element, an installing element, an uninstalling element and a third key generating element. That is, this installer 8 stores a program for controlling a series of operations till making the DES 7 decrypt the software stored in the CD-ROM 1 and installing the decrypted software into the hard disk drive unit 9.

The hard disk drive unit 9 is for storing application program.

The timer 14 inputs the data about a present time to the control CPU 5.

Figure 5:
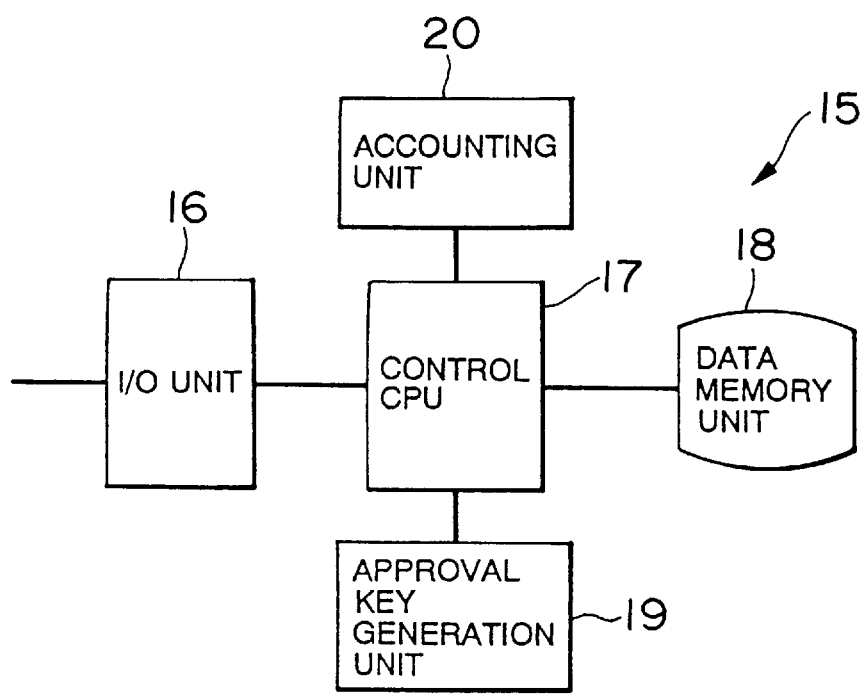
FIG. 5 is a block diagram illustrating a construction of a center constituting the software decrypting apparatus in the first embodiment of the present invention.

Further, FIG. 5 is a block diagram showing a configuration of the center 15 serving as a management device. As obvious from FIG. 5, this center 15 comprises a control CPU 17. The center 15 also comprises an I/O unit 16, a data memory unit 18, an approval key generation unit 19 and an accounting unit 20 that are respectively connected to this control CPU 17.

The control CPU 17 is a processing unit for controlling the operations of the whole center 15. The I/O unit 16 executes inputs and outputs of the data (approval preparatory key, uninstall key and approval key) between the control CPU 17 and the outside. The I/O unit 16 is specifically constructed of devices such as a keyboard, a display unit, a MODEM, etc.

The approval key generation unit 19 serving as a second key generating element generates the approval key on the basis of an approval preparatory key inputted through the I/O unit 16 or an uninstall key. Further, the accounting unit 20 serving as an accounting element, when a new approval key 19 is generated, imposes a running royalty on the user. Also, the data memory unit 18 serving as a storing element is a memory for storing various items of user data needed for generating the approval key and imposing the running royalty.

Next, there will be explained the processes executed by the personal computer system 2, and the center 15 thus constructed with reference to FIGS. 6 and 7. Note that each of the approval preparatory key, the approval key and the decrypting key employed in this embodiment is, as shown in FIGS. 8 through 11, a 16-digit numeral string.

Figure 6:
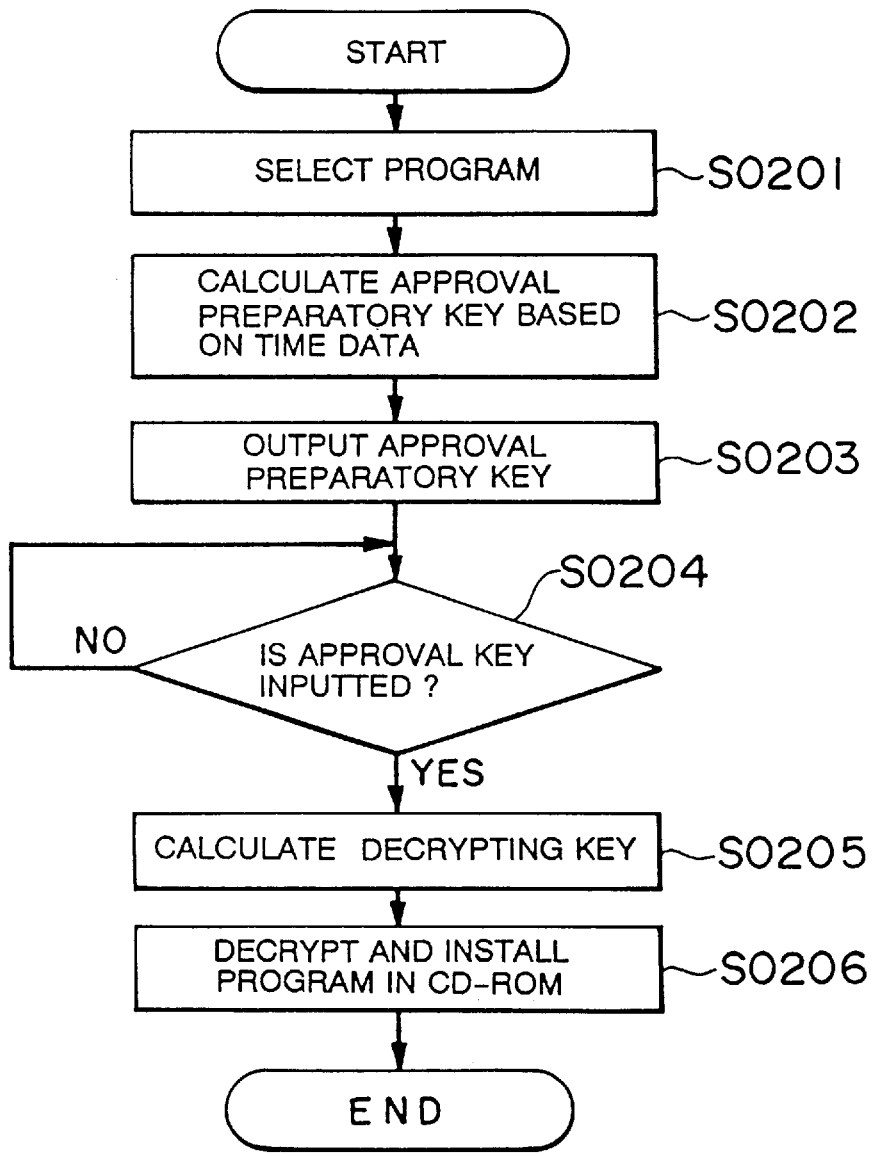
FIG. 6 is a flowchart showing processes executed in the personal computer system of FIG. 4.

FIG. 6 shows processing for decrypting and installing the software executed by the installer 8 of the personal computer system 2. The processing of FIG. 6 starts with an install command inputted through the interface unit 11 after the CD-ROM 1 loaded into the CD-ROM drive unit 21. Then, in the first step S0201, the installer 8 selects the practical version software to be installed from plural sets of practical version software stored in the CD-ROM 1. That is, the installer 8 waits for the user to input a command for specifying the software and determines the software specified by the user as a target for processing.

In subsequent step S0202, the installer 8 creates the approval preparatory key on the basis of the present time data obtained from the timer 14. A characteristic required of a decrypting preparatory key generated by the installer 8 is that a different approval preparatory key is generated each time installing is effected. For this purpose, the installer 8 generates the approval preparatory key from data of install date and time. To be specific, the numeral values are arrayed in sequence as shown in FIG. 9. That is, referring to FIG. 9, a value of the fourth digit of the year is written to a position of "Year 1"; a value of the third digit of the year is written to a position of "Year 2"; a value of the second digit of the year is written to a position of "Year 3"; and a value of the first digit of the year is written to a position of "Year 4". Values are written with respect to month, date, time, minute and second, in the same manner. A random number is written to a remaining position marked with "*". Accordingly, an approval preparatory key generated at 12 h 34' 56", Jul. 26, 1994 is expressed in a numeral string as shown in FIG. 10.

In next step S0203, the installer 8 outputs the approval preparatory key generated in step S0202 to the floppy disk drive unit 12 or the MODEM 23 via the interface unit 11 or displays the key on the monitor unit 13.

In subsequent step S0204, the installer 8 waits an input of the approval key. That is, the installer 8 waits for the user to input the approval key by use of the keyboard 22 or through the floppy disk 12 or the MODEM 23.

Calculated in next step S0205 is a decrypting key from the approval key inputted in step S0204 and the approval preparatory key calculated in step S0202. Namely, a value (minimum digit value) obtained by adding the values of the same digits of the approval preparatory key and of the approval key is written to the same digit of the decrypting key which corresponds the backward calculation of the first arithmetic operation.

In next step S0206, the software within the CD-ROM 1 is installed into the hard disk drive unit 9 while the DES 7 decrypts the software by use of the decrypting key calculated in step S0205.

Figure 7:
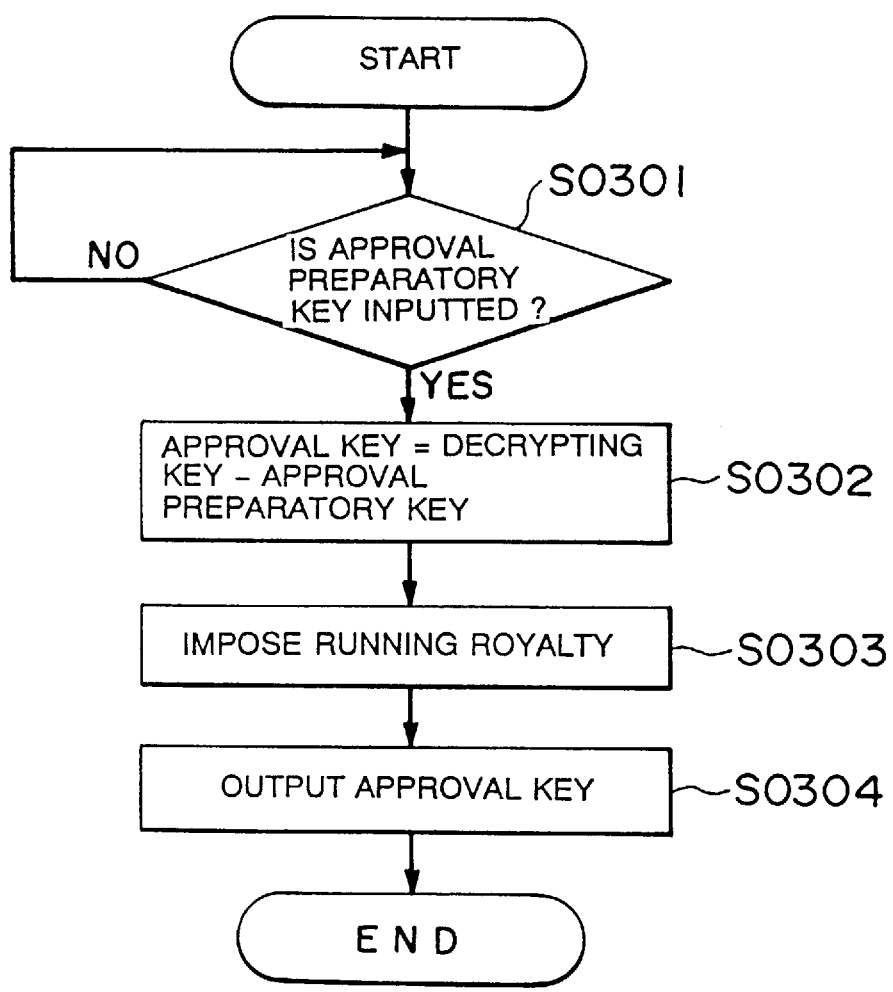
FIG. 7 is a flowchart showing processes executed in the center of FIG. 5.

FIG. 7 shows approval key calculation processing and accounting processing that are executed by the center 15. In first step S0301 of FIG. 7, the center 15 waits an input of the approval preparatory key. That is, the center 15 waits for the user to notify the center itself of the approval preparatory key through a telephone, etc. or the user to transmit the approval preparatory key online through the communications using the MODEM 23.

In subsequent step S0302, the center 15 calculates the approval key from the decrypting key and the approval preparatory key. That is, the value of a difference (10's compliment) obtained by subtracting the value of each digit of the approval preparatory key from the value of same digit of the decrypting key is written to the same digit of the approval key, which corresponds to the first arithmetic operation. FIG. 9 illustrates the approval key generated from the above decrypting key (FIG. 8) and the approval preparatory key (FIG. 10).

In next step S0203, the center 15 imposes a running royalty on the user requesting the approval key. Namely, the center 15 makes a procedure of paying a vending fee of the approval key (a running royalty of the software) from a user's bank account or a credit company.

When completing the payment procedure, the approval key is outputted in step S0304.

<Operation of Embodiment>

Since the approval key is thus calculated as a difference between the decrypting key and the approval preparatory key (step S0302), a content of the approval key changes according to a content of the approval preparatory key. In accordance with this embodiment, the approval preparatory key is created from the present time data (step S0202), and, therefore, the content of the approval ky also changes with every passage of time. Accordingly, when the approval key and the approval preparatory key as a basis of generating the approval key are used, a correct decrypting key is created (step S0205). For instance, the decrypting key with the content illustrated in FIG. 8 is generated from the approval preparatory key having the content shown in FIG. 10 and the approval key having the content shown in FIG. 11. As a result, it is possible to decrypt and install the software.

On the other hand, when an approval preparatory key generated at a time different from the generating time of the approval preparatory key serving as a basis of generating the approval key is used, the correct decrypting key is not calculated for the reason elucidated above. It is thereby possible to prevent both the generation of the decrypting key and an illegal installation thereof in case the user informed the third party of the approval key. Further, after the user has once installed the software into the personal computer system 2, the same software can be prevented from being installed into other personal computer systems by use of the original approval key.

Figure 14:
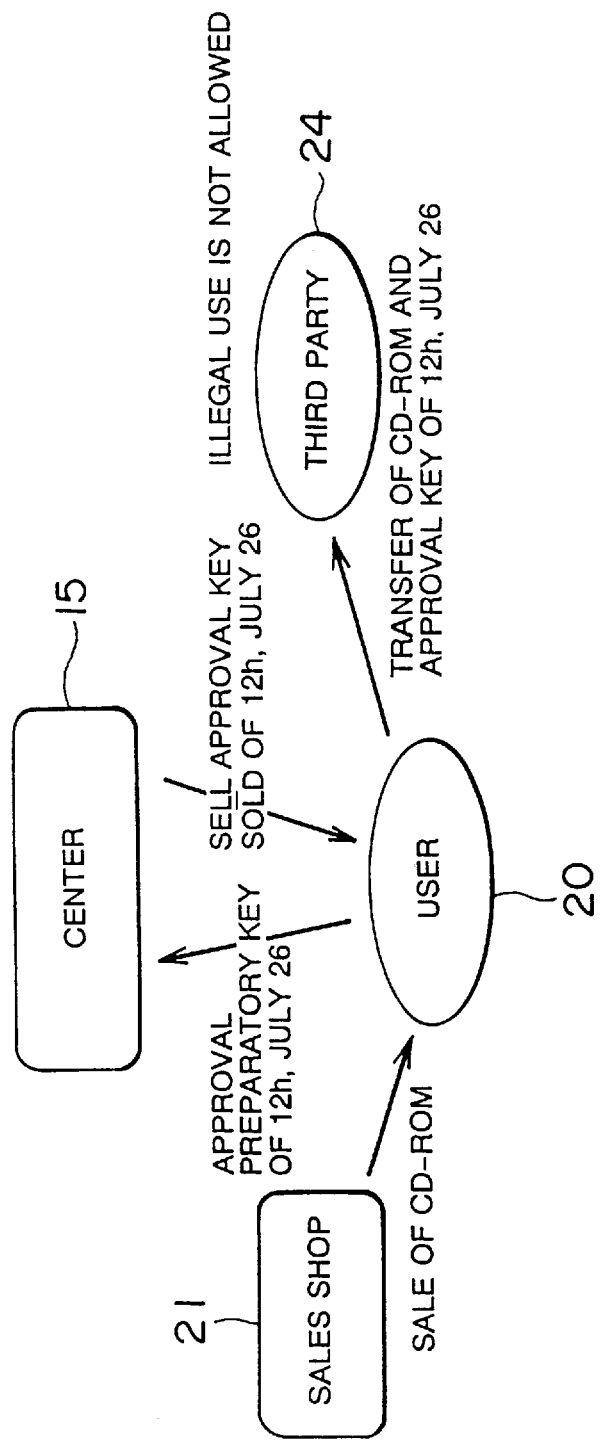
FIG. 14 is an explanatory diagram showing the operation of the first embodiment of the present invention.

For example, as illustrated in FIG. 14, it is assumed that a user 20 purchases the CD-ROM 1 from a sales shop 21 and also purchases the approval key (FIG. 11) generated at 12 h 34' 56", Jul. 26, 1994 from the center 23 on the basis of the approval preparatory key (FIG. 10) generated at 12 h 34' 56", Jul. 26, 1994. In this instance, the personal computer system 2 of the user 20 is allowed to install the software by generating the decrypting key from the above approval preparatory key and approval key.

Next, it is supposed that the user 20 informs a third party 24 of the approval key, and the third party 24 tries to misappropriate this approval key. In this case, the third party 24, after the user 20 has installed the relevant software, gets the approval key shown in FIG. 11 and selects the software by starting up the installer 8 of the personal computer system 2 of his or her own. Supposing that this happens at 23 h 45' 01", Jul. 30, 1994, a content of the approval preparatory key calculated and outputted by the installer 8 goes as illustrated in FIG. 12.

Even if the third party 24 inputs the approval key (FIG. 11) gotten from the user 20 to the installer 8 which has generated this approval preparatory key, the decrypting key generated as a result of this becomes an incorrect value as shown in FIG. 13. Accordingly, the third party 24 is incapable of decrypting the software.

As described above, if the approval preparatory key is generated for each installation, it follows that the approval key issued by the center 15, as a result, differs each time. With a measure taken in this way, even if the third party 24 misappropriates the approval key purchased by the user 20 from the center 15 on a certain date and time, the approval key is ineffective at a time when the third party 24 will install, thus making the illegal installation impossible.

Second Embodiment

Figure 15:
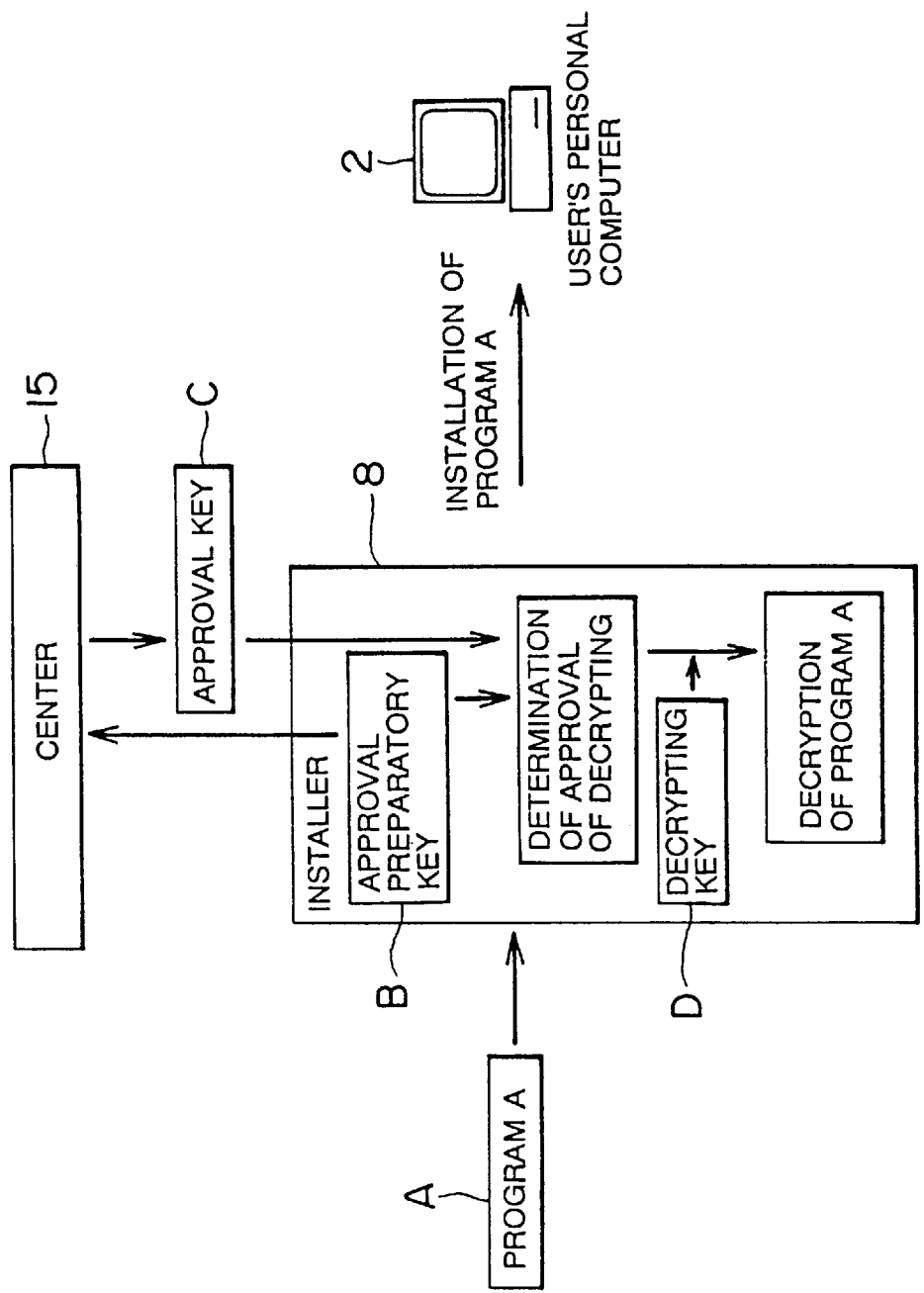
FIG. 15 is a schematic diagram illustrating the software decrypting apparatus in a second embodiment of the present invention.

An outline of the software decrypting system in a second embodiment of the present invention will be explained. FIG. 15 illustrates a case where the user installs the program A on the CD-ROM 1 into the personal computer system 2. The program A is encrypted but can not be installed as it is. For the installation thereof, it is required that the encrypted program A is decrypted in the installer 8.

A difference from the first embodiment discussed above is that the installer 8 is previously possessed of the decrypting key in its interior. The installer 8 serving as a decrypting device makes a decrypting approval determination about whether or not the decrypting is performed based on the approval key defined as a second key and the approval preparatory key defined as a first key.

A relationship between the approval preparatory key and the approval key is the same as that in the first embodiment described above. Then, the approval key is generated by the center 15 serving as the management device on the basis of the approval preparatory key generated by the installer 8 when installing. That is, when the approval preparatory key changes, the approval key also changes.

In this way, installing the program A requires the approval key C corresponding to the approval preparatory key B generated at that time. Accordingly, the third party is unable to install the program A illegally into the separate personal computer system 2 by misappropriating the approval key C.

Figure 16:
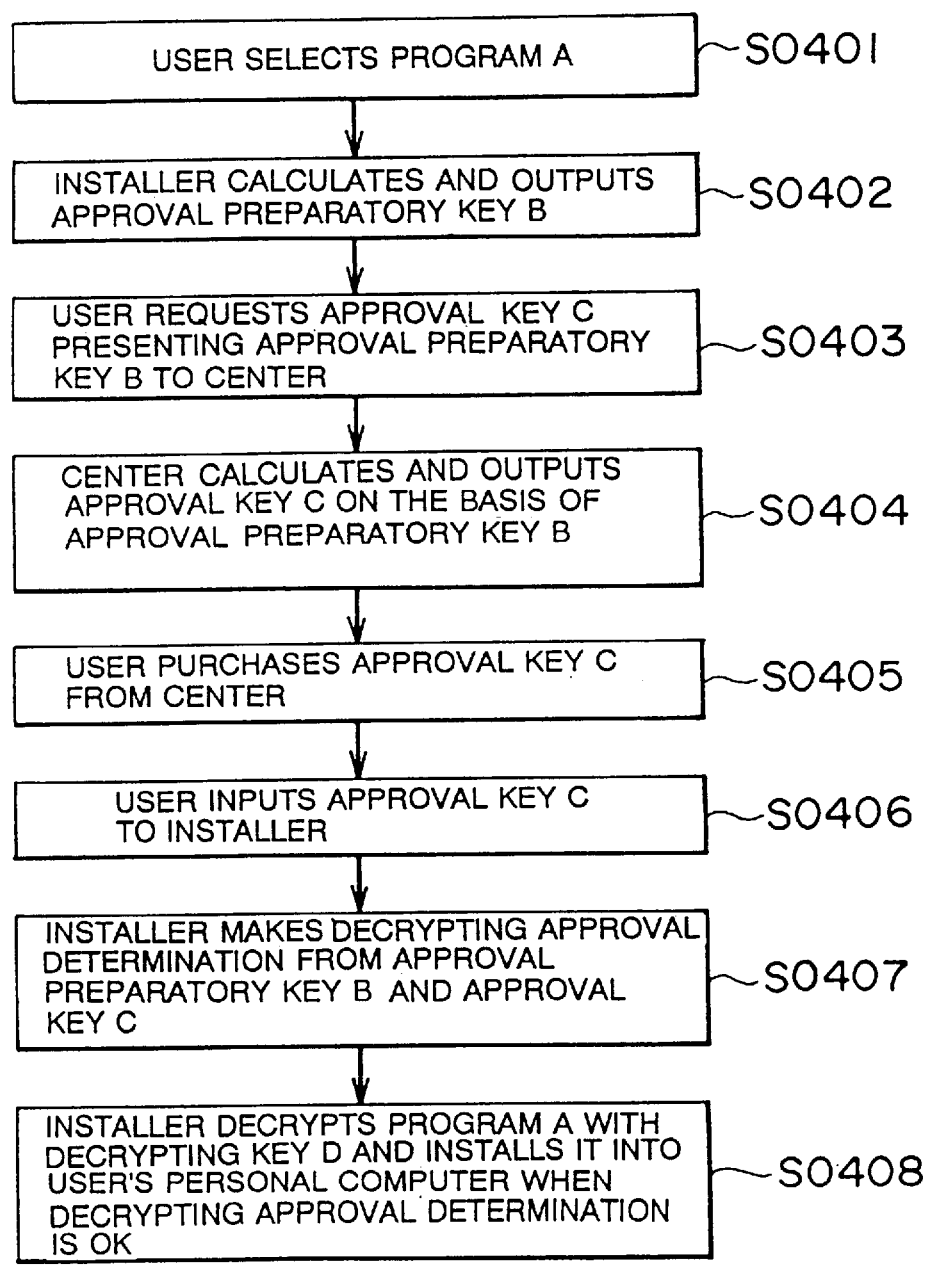
FIG. 16 is a flowchart showing an outline of processing procedures in the apparatus of FIG. 15.

FIG. 16 shows procedures of installing the software. As shown in these procedures, first, the user selects the program A from encrypted sets of software stored in the CD-ROM 1 (step S0401), and the installer 8 calculates the approval preparatory key B and outputs this approval preparatory key B (step 0402). When the user presents this approval preparatory key B to the center 15 and requests the approval key C (step S0403), the center 15 calculates the approval key C on the basis of the approval preparatory key B and outputs this approval key C (step S0404).

The user purchases this approval key C (step S0405) and inputs the approval key C to the installer 8 (step S0406). The installer 8 makes the decrypting approval determination on the basis of the approval preparatory key B and the approval key C (step S0407). If the decrypting approval determination is OK, the installer 8 decrypts the program A by use of the decrypting key D incorporated thereinto and installs the program A into the user's personal computer system (step S0408).

Other configurations and operations in the second embodiments are the same as those in the first embodiment, and hence their explanations will be omitted.

Third Embodiment

In accordance with the first embodiment, the approval preparatory key and the approval key change each time the installation is effected, thereby preventing the third party from misappropriating these keys. This arrangement makes it possible to obviate the first problem inherent in the prior art. The second problem can not be, however, effectively solved. The software decrypting apparatus in this third embodiment has a construction capable of obviating even the second problem, obtaining the approval key free of charge on such an occasion that the regular user makes a reinstallation or installs it into a newly purchased personal computer system.

<Construction of Embodiment>

The specific hardware architectures of the installer 8 and the center 15 that perform the above-described control are the same as those in the first embodiment, and hence the explanations thereof will be omitted.

Figure 17:
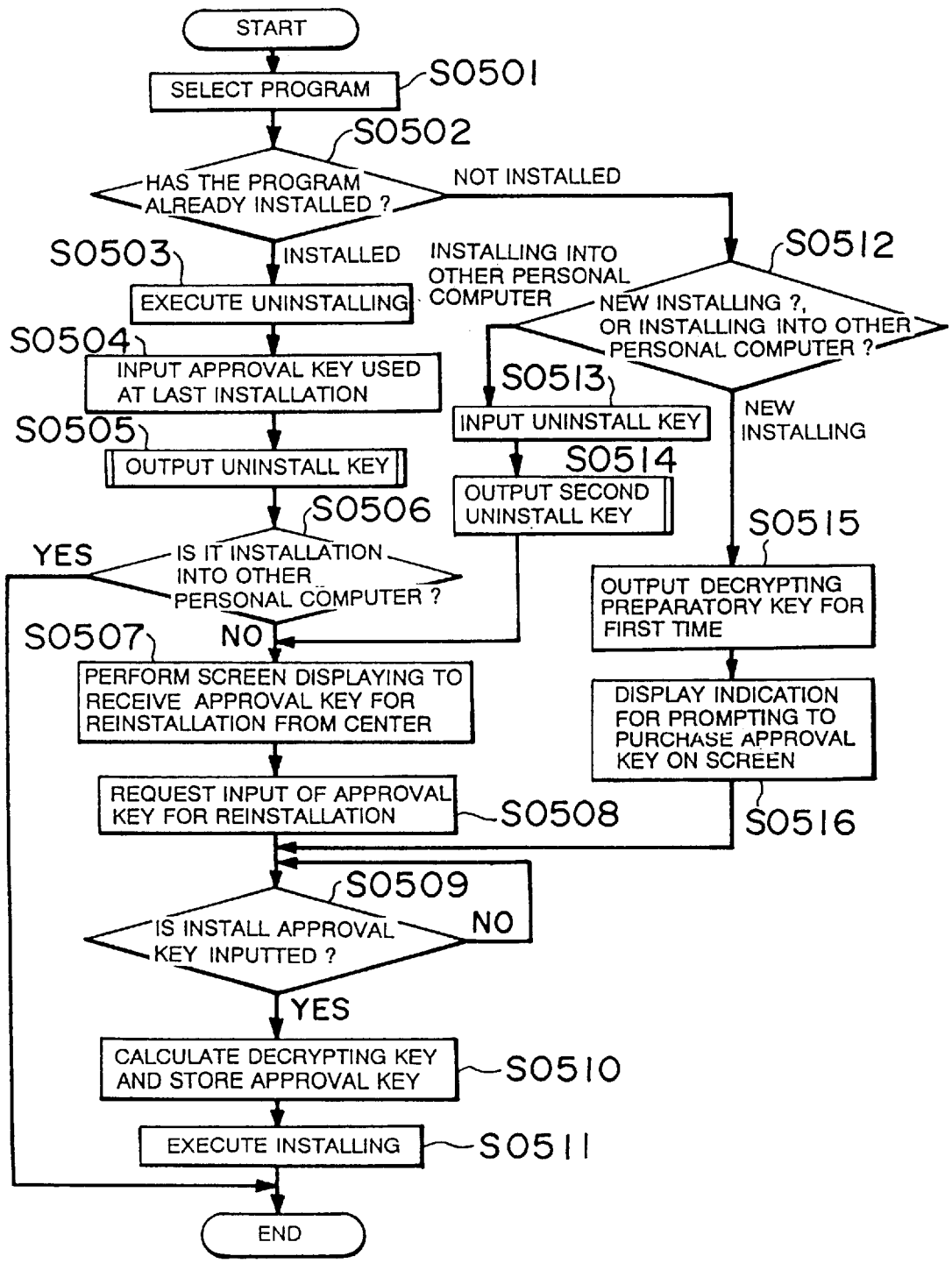
FIG. 17 is a flowchart showing processes executed in the personal computer system in a third embodiment of the present invention.
Figure 18:
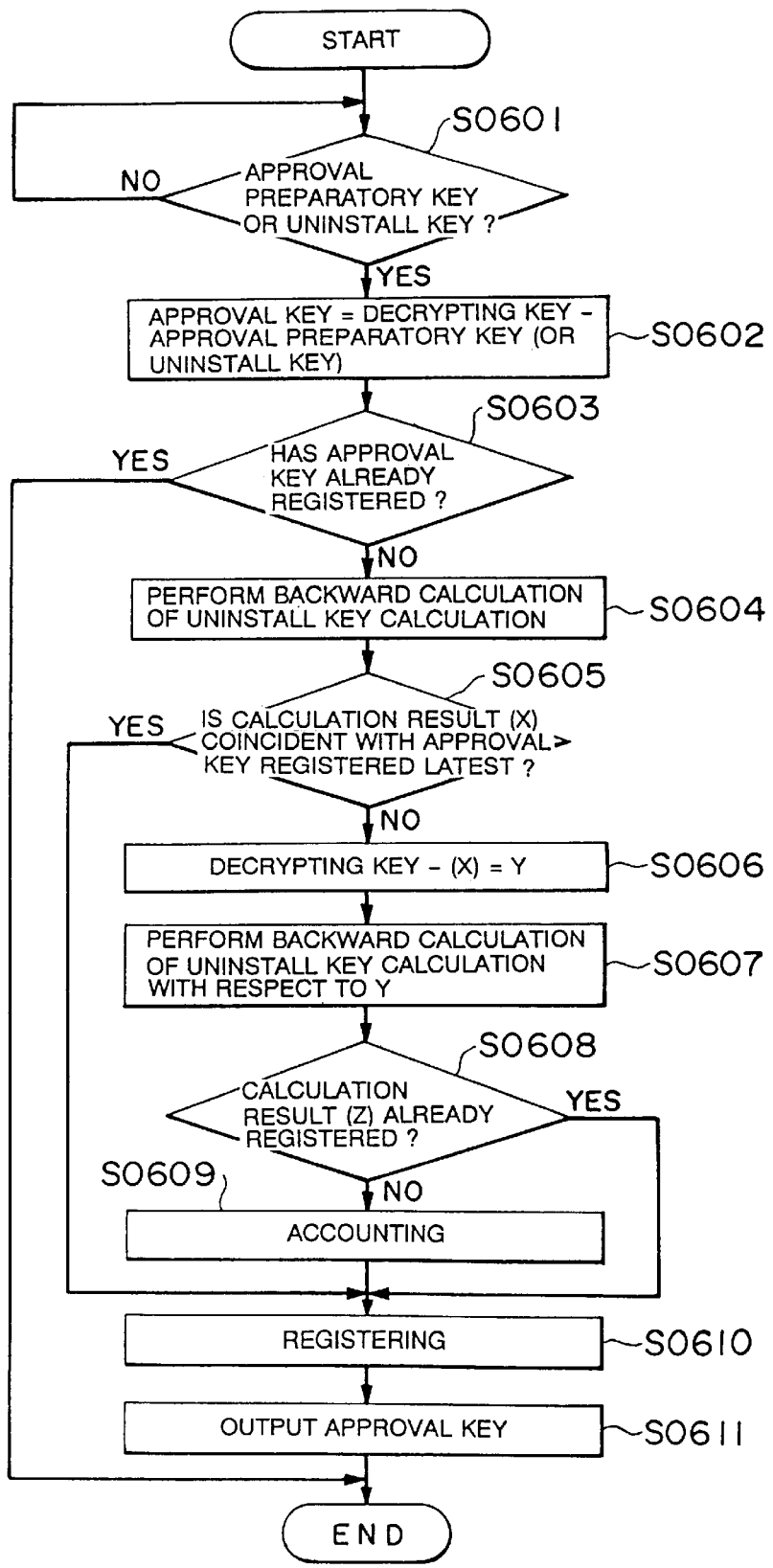
FIG. 18 is a flowchart showing processes executed in the center in the third embodiment of the present invention.
Figure 19:
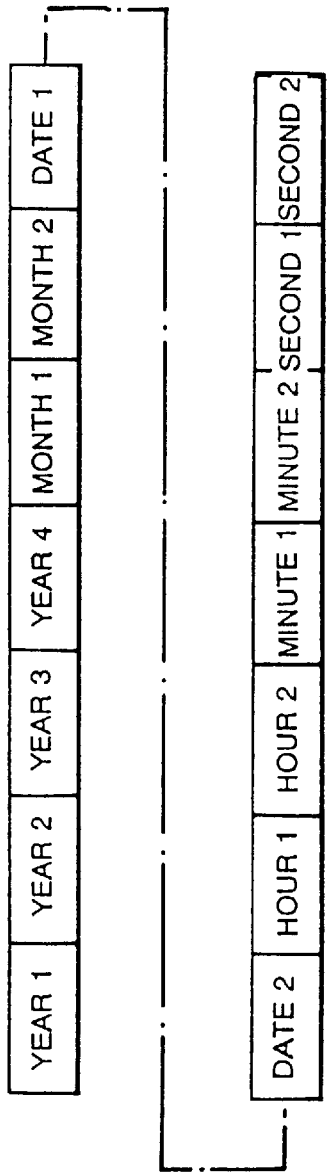
FIG. 19 is a diagram showing a structure of first 14 digits of the approval preparatory key used in the third embodiment of the present invention.
Figure 20:
FIG. 20 is a diagram showing a structure of last 6 digits of the approval preparatory key used in the third embodiment of the present invention.

Given next is an explanation of the processes executed by the personal computer system 2 and the center 15 with reference to FIGS. 17 and 18. Note that each of the approval preparatory key, the approval key and the decrypting key that are employed in this embodiment is, as shown in FIGS. 19 and 20, a 20-digit numeral string. Stored also in the CD-ROM 1 purchased by the user from the sales shop are plural kinds of software (for practical version) encrypted by a specified key and non-encrypted trial version software (with some functions omitted) corresponding to this practical version software. Note that these sets of software are not necessarily programs but may be data such as, e.g., image data.

Decrypting the encrypted software entails the use of the same key (decrypting key) as the one used when the software encrypted. Herein, it is assumed that there is used a key all these twenty digits of which are "0".

FIG. 17 shows processing for decrypting and installing the software executed by the installer 8 of the personal computer system 2. The processing of FIG. 17 starts with the install command inputted through the interface unit 11 after the CD-ROM 1 loaded into the CD-ROM drive unit 21. Then, the installer 8, in first step S0501, selects the practical version software to be installed from plural sets of practical version software stored in the CD-ROM 1. Alternatively, the installer 8 selects the software to be uninstalled among sets of software installed into the hard disk drive unit 9. That is, the installer 8 waits for the user to input a command for specifying the software and determines the software specified by the user as a target for processing.

In subsequent step S0502, the installer 8 checks whether or not the selected software has already been installed into the hard disk drive unit 9 of the computer system 2. If not already been installed, it can be presumed that this may be a new installation or an installation into the personal computer system 2' other than the personal computer system 2 installed originally with the software, Then, in step S0512, there is checked whether or not this is the new installation or the installation into other personal computer system 2. This check is performed based on an input from the user.

When the user selects the new installation, in step S0515, a decrypting preparatory key defined as a first key for the first installation is created based on an item of present install time data obtained from the timer 14. A characteristic required of an approval preparatory key generated by the installer 8 is that it is generated with different contents each time installing is effected. For this purpose, the installer 8 generates the approval preparatory key from data of install date and time. To be specific, the numeral values are arrayed in the first 14 digits in sequence as shown in FIG. 19. The random numbers are arranged in the last 6 digits as shown in FIG. 20. That is, as illustrated in FIGS. 19 and 20, there are written values of 4 digits for the year, 2 digits for a month, 2 digits for a date, 2 digits for an hour, 2 digits for a minute, 2 digits for a second and 6 digits for a random number in sequence from the most significant digit. The created approval preparatory key is outputted via the interface unit 11 to the floppy disk drive unit 12 or the MODEM 23 or displayed on the monitor unit 13.

In next step S0516, the installer 8 displays, on the monitor unit 13, the effect that the user is prompted to newly purchase the approval key as a second key. The processing proceeds to subsequent step S0509, wherein the installer 8 waits an input of the approval key. That is, the installer 8 waits for the user to input the approval key by use of the keyboard 22 or through the floppy disk drive unit 12 or the MODEM 23.

The installer 8, when inputting the approval key in step S0509, calculates a decrypting key from the approval key inputted in step S0509 and the approval preparatory key calculated in step S0515. Namely, a value (minimum digit value) obtained by adding the values of the same digits of the approval preparatory key and of the approval key is written to the same digit of the decrypting key, which corresponds to the backward calculation of the first arithmetic operation. When the decrypting key has been calculated, this approval key is stored in the hard disk drive unit 9.

In next step S0511, the installer 8 installs the software within the CD-ROM 1 into the hard disk drive unit 9 while the DES 7 decrypts the software. Thereafter, the installer 8 finishes the processes of FIG. 17.

On the other hand, when determining that the selected software has already been installed into the hard disk drive unit 9 in step S0502, this implies a case where the software is to be reinstalled. In this case, uninstalling the relevant software (deleting it from the hard disk drive unit 9) has to be executed for preventing the software from being copied plural times. Accordingly, the processing proceeds to step S0503, wherein the installer 8 executes the uninstalling.

In subsequent step S0504, the installer 8 reads and inputs the approval key from the hard disk drive unit 9 that has been used when installing the software last time, which is uninstalled in step S0503.

In subsequent step S0505, a subroutine (corresponding to the second arithmetic operation) (FIG. 21) of outputting the uninstall key defined as a third key is called.

Figure 21:
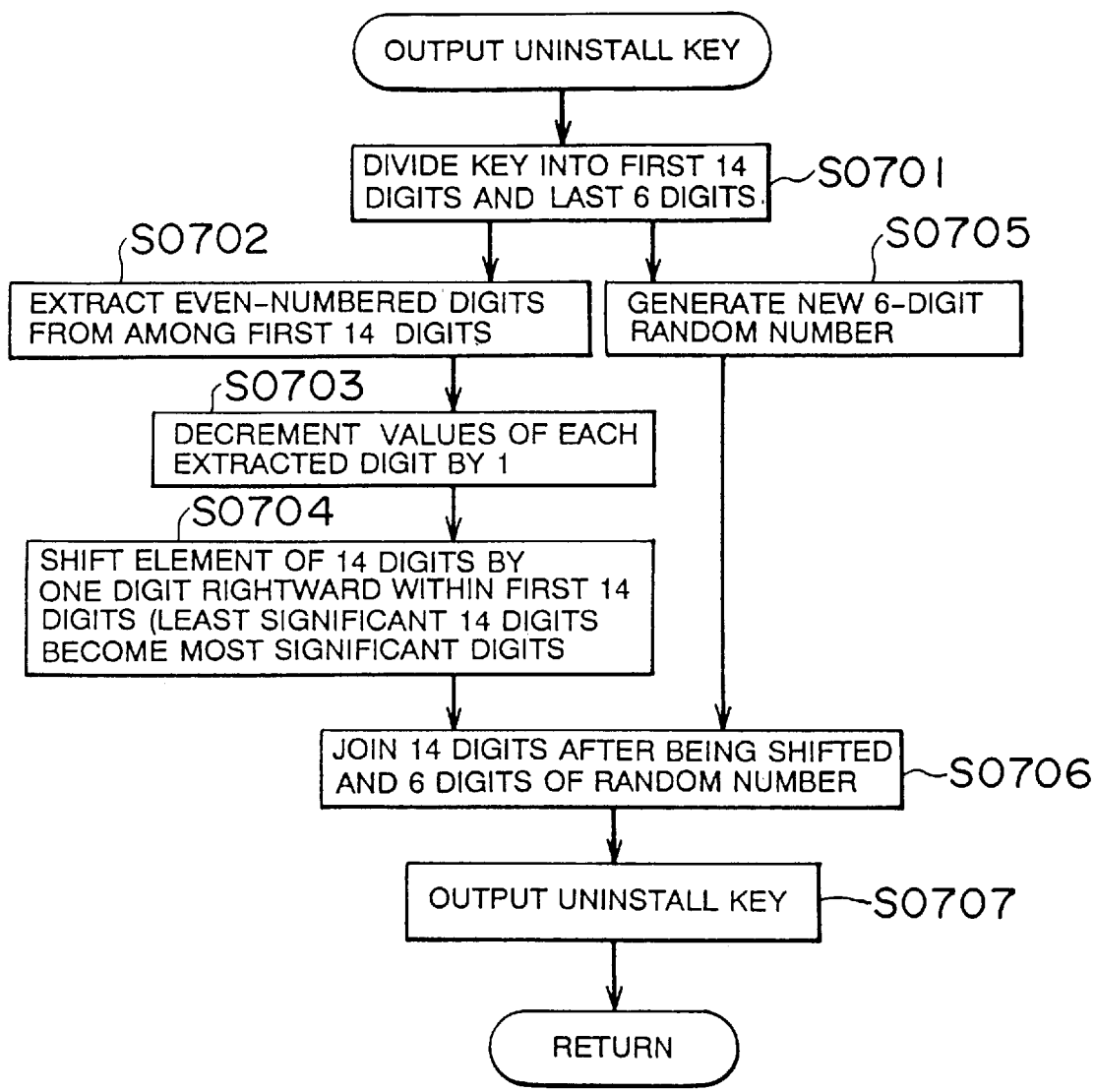
FIG. 21 is a flowchart showing subroutine for outputting an uninstall key that is executed in step S0505 of FIG. 17.

In first step S0701 of the subroutine of FIG. 21, the approval key used for installation at last time inputted in step S0504 is divided into the first 14 digits and the last 6 digits. Then, a new 6-digit random number is generated in the last 6 digits in step S0705.

On the other hand, only even-numbered digits are extracted from the first 14 digits in step S0702. Then, in step S0703, the value of the even-numbered digits extracted in step S0702 is decremented by 1 (set to "9" in the case of "0"). Subsequently, in step S0704, the values of all the first 14 digits are shifted rightward (toward the last digit) by one digit. However, the value of the least significant digit among the first 14 digits is shifted to the most significant digit among the first 14 digits.

In step S0706, the values of the first shifted 14 digits are joined to the random number of the new last 6 digits, thereby creating a 20-digit uninstall key. In next step S0707, the thus created uninstall key is outputted via the interface unit 11 to the floppy disk drive unit 12 or the MODEM 23 or displayed on the monitor unit 13. Thereafter, this uninstall subroutine is finished, and the processing is returned to a main routine of FIG. 17.

In next step S0506 of FIG. 17, there is checked whether or not uninstalling of this time is for reinstalling into other personal computer system 2'. Note that this check is done based on an input from the user. If the user selects the installation into other personal computer system 2', the installer 8 finishes this processing as it is.

Whereas if the user inputs such an effect that the installation is not the one into other personal computer system 2', this can be determined as a case of reinstalling into this personal computer system 2. Then, the installer 8, when the processing proceeds to step S0507, displays, on the monitor unit 13, the effect that the user is prompted to receive the approval key for the reinstallation from the center 15. Subsequently, in step S0508, there is displayed a request for inputting the approval key for the reinstallation. Then, in step S0509, inputting the approval key for the reinstallation is waited.

When the approval key is inputted in step S0509, the installer 8 in step S0510 calculates the decrypting key from the uninstall key calculated in step S0505 and the approval key inputted in step S0509. Namely, a value (minimum digit value) obtained by adding the values of the same digits of the approval preparatory key and of the approval key is written to the same digit of the decrypting key, which corresponds to the backward calculation of the first arithmetic operation. When the decrypting key has been calculated, the approval key is stored in the hard disk drive unit 9.

In next step S0511, the installer 8 installs the software within the CD-ROM 1 into the hard disk drive unit 9 while the DES 7 decrypts the software. Thereafter, the installer 8 finishes the processes of FIG. 17.

Given next is an explanation of the control in a case where the installation into other personal computer system 2' is selected in step S0506, and, thereafter, the processes of FIG. 17 are executed in other personal computer system 2'. In this instance, the user selects the installation into other personal computer system 2 in step S0512. In this case, the processing goes to step S0513.

In this step S0513, there is a wait for inputting the uninstall key outputted by executing the process of step S0505 in the personal computer system 2 into which the software had been initially installed, and from which the software has been uninstalled. Corresponding to this, the user inputs the uninstall key. In this instance, the subroutine (FIG. 22) for outputting the second install key is executed in subsequent step S0514.

Figure 22:
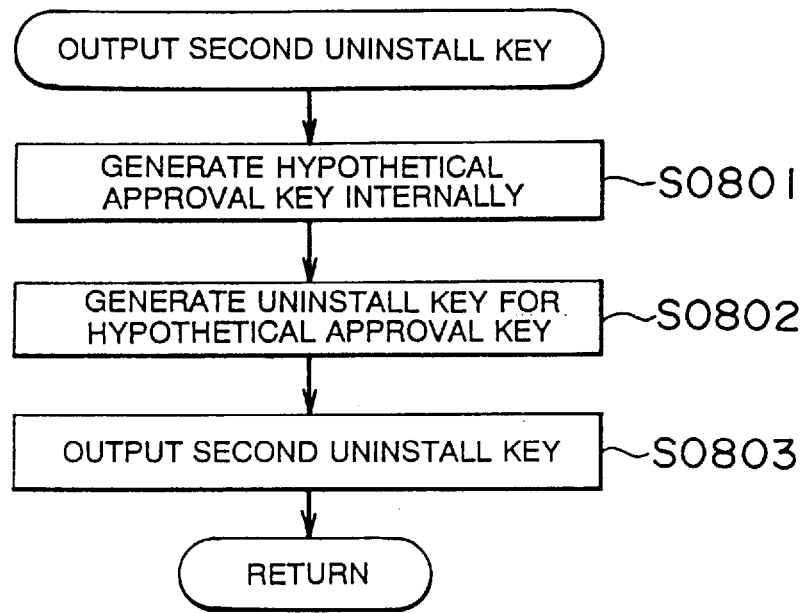
FIG. 22 is a flowchart showing subroutine for outputting a second uninstall key that is executed in step S0514 of FIG. 18.

In first step S0801 in the subroutine of FIG. 22, a hypothetical approval key is internally created. That is, as in the same way as creating the approval key in the first embodiment, a value of a difference (10's compliment) obtained by subtracting a value of each digit of the uninstall key inputted in step S0513 from a value of same digit of the decrypting key is written to the same digit of the virtual approval key (wherein 0 continues throughout 20 digits), which corresponds to the first arithmetic operation.

Generated in next step S0802 is the uninstall key with respect to the hypothetical approval key created in step S0801. Specifically, there are executed the processes from step S0701 to step S0706 of FIG. 21.

In next step S0803, the second uninstall key generated in step S0802 is outputted via the interface unit 11 to the floppy disk drive unit 12 or the MODEM 23 or displayed on the monitor unit 13. Thereafter, this second uninstall key output subroutine comes to an end, and the processing returns to the main routine of FIG. 17.

In following steps inclusive of next step S0507 of FIG. 17, there are performed the same processes as those in the case of the reinstallation into the same personal computer system 2.

As a result of executing the above processes, a relationship between the decrypting key, the approval preparatory key or the uninstall key and the approval key in the case of the same user installing the same software plural times goes as shown in Table 1. This Table 1 shows an example where the first installation is executed at 12 h 34' 56", Aug. 3, 1994.

TABLE 1

| | 0000000000000000 | |
|---|---|---|
| Decrypting Key | Approval Prep./Key Uninstall Key (issued by installer) | Approval Key (issued by center) |
| 1st Install | 19940803123456712589 | 91160207987654398521 |
| 2nd Install | 48106929788664821625 | 62904181322446289485 |
| 3rd Install | 65280317122143117342 | 45820793988967993768 |

FIG. 18 is a flowchart showing the processes for calculating the approval key and imposing a running royalty, which are to be executed by the center 15. A premise for executing the processes of FIG. 18 is that the data memory unit 18 of the center 15 stores the user data as shown in Table 2. That is, the data memory unit 18 stores a number of user's bank account and the number of installations of the software according to every user purchasing the approval key of each software. The data memory unit 18 also stores all of the approval preparatory key or the uninstall key issued by the installer 8 and the approval key issued by the center 15 itself each time the installation is conducted.

TABLE 2

| User Name/Number of Bank Account | Number of Inst. | Approval Prep. Key/Uninstall Key (issued by Installer) | Approval Key (issued by Center) |
|---|---|---|---|
| User α ○○□ | Once | 19940803123456712589 | 91160207987654398521 |

TABLE 2-continued

| User Name/Number of Bank Account | Number of Inst. | Approval Prep. Key/Uninstall Key (issued by Installer) | Approval Key (issued by Center) |
| --- | --- | --- | --- |
| | Twice | 481069297886648 21625 | 6290418132244 6289485 |
| | Three Times | 652803171221431 17342 | 4582079398896 7993768 |
| User β Δ○□ | Once | 199407152010048 26363 | 9116039580900 6284747 |
| | Twice | 681069385708094 42513 | 4290417253020 1668597 |

In first step S0601 of FIG. 18, the center 15 waits inputting of the approval preparatory key (or the uninstall key). That is, the center 15 waits for the user to notify the approval praparatory key (or the uninstall key) through a telephone, etc. or to transmit the approval preparatory key (or the uninstall key) online through the communications using the MODEM 23.

In next step S0602, the center 15 calculates the approval key from the decrypting key and the approval preparatory key (or the uninstall key). Namely, a value of a difference (10's compliment) obtained by subtracting the value of each digit of the approval preparatory key (or the uninstall key) from the value of the same digit of the decrypting key is written to the same digit of the approval key, which corresponds to the first arithmetic operation.

In next step S0603, the center 15 determines whether or not the first 14 digits of the approval key generated in step S0602 have already been registered in the data memory unit 18 as those for this software and for this user. If registered, it follows that this software has already been installed but is not uninstalled. Accordingly, the processing of FIG. 18 comes to an end as it is without outputting the approval key (step S0611). It is therefore possible to prevent the same user from illegally installing the same software into a plurality of personal computer systems 2 simultaneously and also prevent the illegal installation of this software by the third party who acquired the uninstall key from the user.

Whereas if the center 15 determines that the approval key is not yet registered in step S0603, a backward calculation of arithmetic creating an uninstall key is performed in subsequent step S0604. That is, a backward calculation of arithmetic criating a uninstall key shown in FIG. 21 is executed with respect to the approval key or the uninstall key inputted in step S0601 (determining which key is inputted is not yet done at that point of time.), and the approval key serving as a basis of the uninstall key is analyzed.

Checked in subsequent step S0605 is whether or not a digit string (X) of the first 14 digits as a result of the backward calculation in step S0604 is coincident with a value of the first 14 digits of the approval key registered latest in the data memory unit 18 with respect to this user. If the two values are coincident as a result of this check, the uninstalling is executed based on the approval key of the last time, and, besides, it can be determined that reinstalling is not conducted thereafter. Accordingly, for the purpose of issuing the approval key with no charge, the center 15 registers the approval key calculated in step S0602 and the inputted uninstall key in the data memory unit 18 (step S0610), and outputs the calculated approval key as it is (step S0611), without impos ing any charge (step S0609).

Whereas if the de termination in step S0605 is that the two values are not coincident, there is calculated a digit string (Y). That is, a value of a difference (10's compliment) obtained by subtracting the value of each digit of the result (X) of the calculation in step S0604 from the value of the same digit of the decrypting key is written to the same digit of the digit string (Y). In next step S0607, an uninstall key backward calculation similar to step S0604 is performed with respect to the result (Y) of the calculation in step S0606. Checked in next step S0608 is whether or not the same approval key as the first 14 digits of a calculation result (Z) in step S0607 has already registered. This is a check about whether or not the approval preparatory key or the uninstall key inputted in step S0601 is identical with the second uninstall key generated in step S0514.

If it is determinted that t he key was already registered in step S0608, it is possible to determine that the second uninstall key has been inputted in step S601. In this case, the approval key should be issued free of charge, and, therefore, the center 15 registers the approval key calculated in step S0602 and the inputted uninstall key in the data memory unit 18 (step S0610) without imposing the running royalty (step S0609). Then, the calculated approval key is outputted as it is (step S0611).

In contrast with this, when it is determined that the calculation result (Z) is not registered in step S0608, it is possible to make a decision that the approval key for the first installation is requested. Namely, the key inputted in step S0601 is, it can be determined, the approval preparatory key. Accordingly, a running royalty is imposed on the user requesting the approval key in step S0609. More specifically, there is made a procedure of withdrawing a vending fee (a running royalty of the software) for the approval key from the user's bank account or from the credit company. When completing the procedure for the withdrawal, the user data (containing the approval key and the approval preparatory key) are registered in the data memory unit 18 (step S0610), and this approval key is outputted (step S0611).

As discussed above, in accordance with the third embodiment, the center 15 manages the names of the users and the install hystories. Hence, if the third party pretends to be a regular user trying to obtain the approval key without cost, and even if the third party presents, e.g., the third uninstall key to the center 15, the center can recognize that the third approval key has already been issued to the regular user (step S0603). Therefore, the center 15 can easily detect that the request from the third party is illegal.

<Operation of Embodiment>

Explanatory examples which follow are based on such a premise that the decrypting key, the approval preparatory key or the uninstall key and the approval key are set as shown in Table 1.

(First Case)

Figure 23:
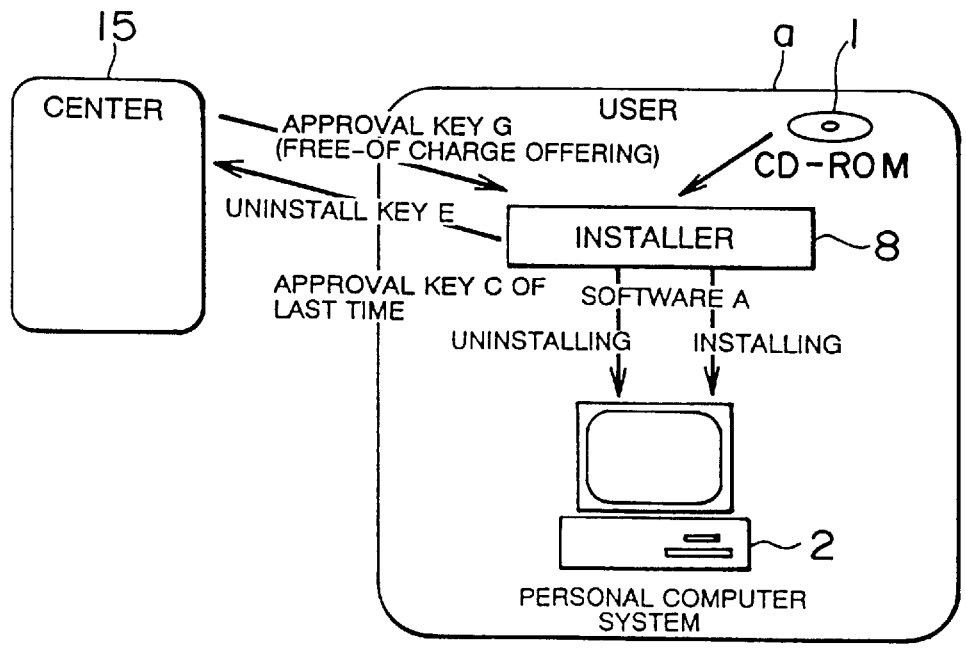
FIG. 23 is an explanatory diagram showing (first case of) the operation of the third embodiment of the present invention.

Given herein is an example where a regular user a uses the installer 8 to reinstall software A within the CD-ROM 1 into the personal computer system 2 (see FIG. 23).

The user α has already installed the software A by use of the approval preparatory key B (19940803123456712589) and the approval key C (91160207987654398521). Further, the approval key C (91160207987654398521) employed when the software A installed is recorded and stored in the hard disk drive unit.9.

If the user α selects the software A by starting up the installer 8 at the time of reinstallation (step S0501), the installer 8 retrieves the hard disk drive unit 9 to confirm whether or not the software A has already been installed into the personal computer system 2 (step S0502).

Figure 24:
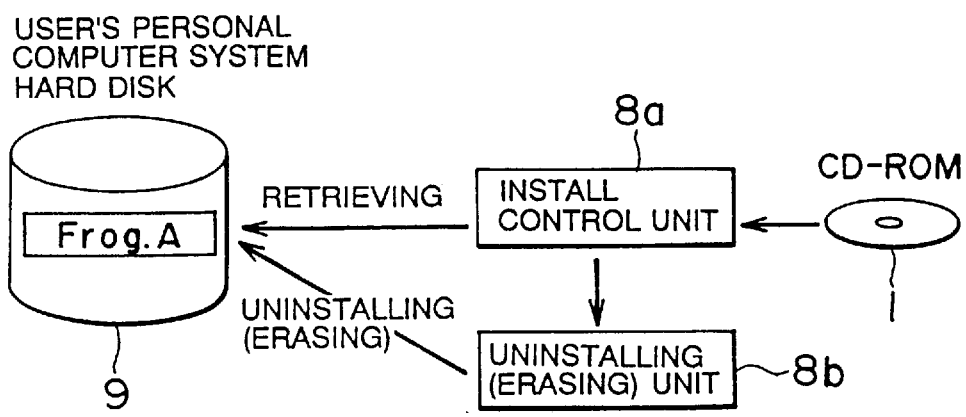
FIG. 24 is a functional block diagram showing functions when uninstalled in the first case.

A result of the confirmation is that the software A has already been installed, and hence there starts uninstalling (erasing) of the installed software A (step S0503). After finishing the uninstalling, the software A comes to be nonexistent in the personal computer system 2 of the user α (see FIG. 24).

Figure 25:
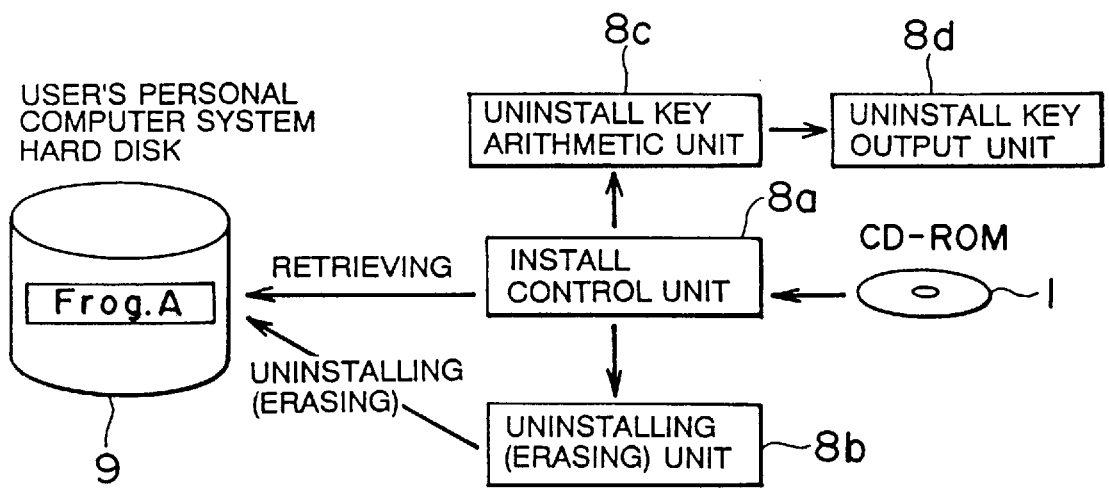
FIG. 25 is a functional block diagram showing functions when outputting the uninstall key in the first case.
Figure 26:
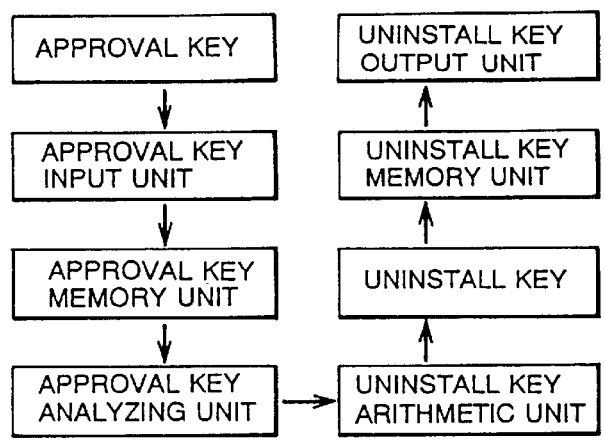
FIG. 26 is a functional block diagram showing functions when calculating the uninstall key in the first case.
Figure 27:
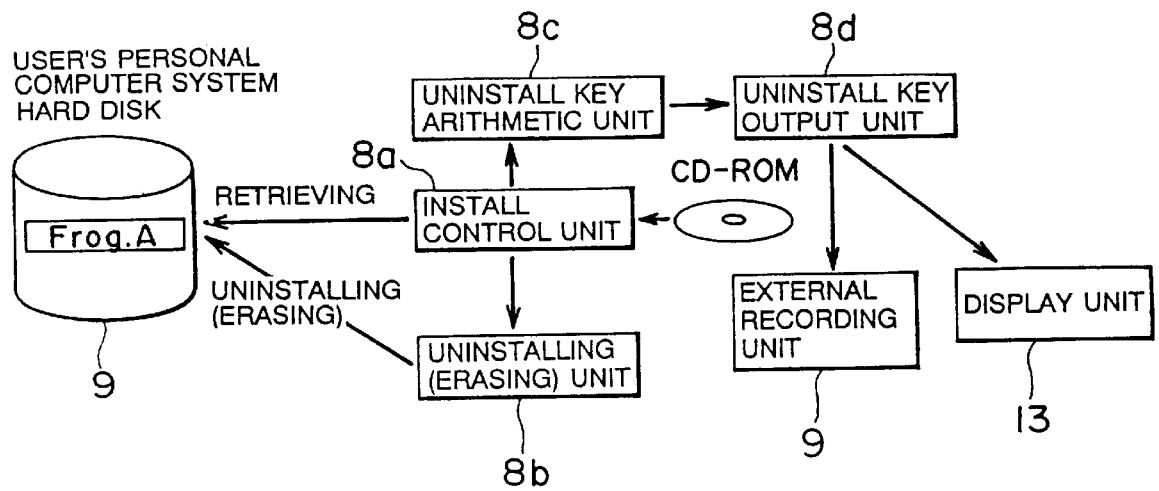
FIG. 27 is a functional block diagram showing functions when display-outputting the uninstall key in the first case.

The installer 8, after finishing the uninstalling, generates and outputs the uninstall key E (48106929788664821625) on the basis of the approval key C (91160207987654398521) used after the installation of last time (step S0505) (see FIGS. 25 and 26). The uninstall key E may be displayed on the screen, or there may also be effected a file output to the floppy disk, etc.

The user α presents this uninstall key E (48106929788664821625) to the center 15 and requests an approval key G for reinstalling. The center 15 analyzes the uninstall key E (48106929788664821625), thereby confirming that the user α has certainly executed the uninstalling of the software A installed in the past (step S0605). Then, the center 15 offers an approval key G (62904181322446289485) to a user α with no charge (step S0611).

(Second Case)

Figure 28:
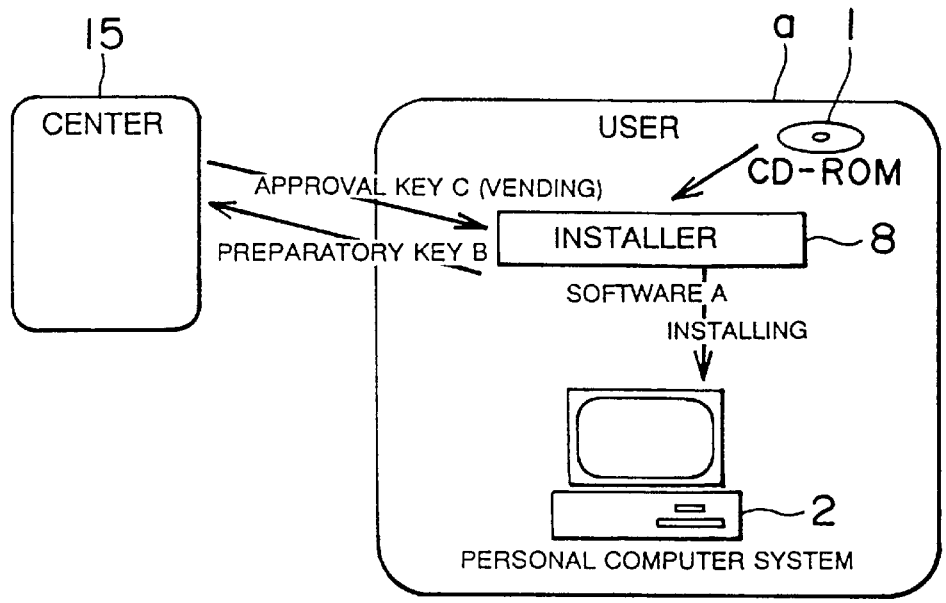
FIG. 28 is an explanatory diagram showing (second case of) the operation of the third embodiment of the present invention.

There will be described an example where the regular user α usues the installer 8 to install the software A within the CD-ROM 1 into the personal computer system 2 for the first time (See FIG. 28).

The user α selects the software A by actuating the installer 8 (step S0501). The installer 8 retrieves the hard disk drive unit 9, thereby confirming whether or not the software A has already been installed into the personal computer system 2 (step S0502).

The user α did not install the software A in the past, and hence the installer 8 makes the user α select "New Installing" or "Installing into Other Personal Computer System" according to a desire of the user α (step S0512). If the user α selects the new installing, the approval preparatory key B (19940803123456712589) for the first time is outputted (step S0515), and a message saying that "Newly purchase the approval key" is displayed on the screen, thus prompting the user α to purchase the approval key (step S0516).

The user α communicates with the center 15 and presents the approval preparatory key B (19940803123456712589). The user α then purchases the approval key C (91160207987654398521) and thus becomes a regular user (step S0609).

The center 15 registers the user data (including the approval key) of the user α (step S0610) and transfers the approval key C (91160207987654398521) to the user α (step S0611).

The user α inputs the approval key C (91160207987654398521) to the installer 8 (step S0509), thus completing the installing operation (step S0510, S0511).

"Third Case"

Figure 29:
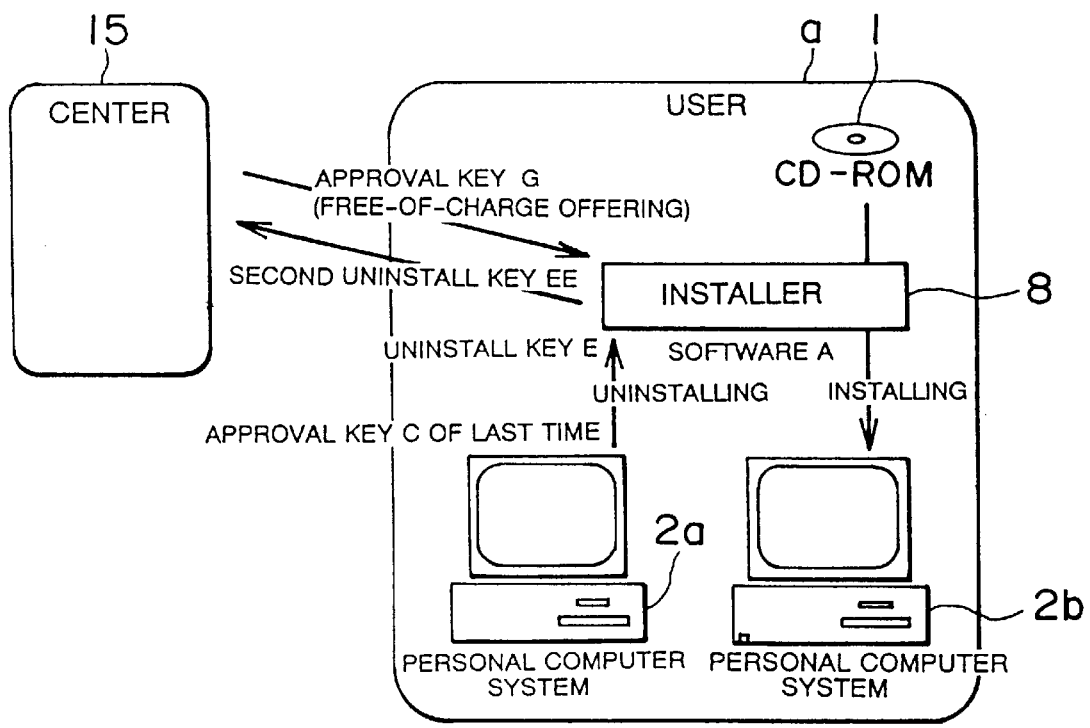
FIG. 29 is an explanatory diagram showing (third case of) the operation of the third embodiment of the present invention.

Given herein is an example where the user α who had installed the software A within the CD-ROM 1 into a personal computer system 2a in the past will install the software A into a new personal computer 2b which has additionally been bought (see FIG. 29).

The user α starts up the installer 8 of the personal computer system 2a into which the software A has already been installed and selects the software A as an uninstall target software (step S0501). The installer 8, after finishing the uninstalling, reads the approval key C (91160207987654398521) recorded in the personal computer system 2a when the software A installed last time (step S0504). The installer 8 then generates and outputs the uninstall key E (48106929788664821625) as a sure sign of the completion of uninstalling on the basis of the approval key C (step S0505). The uninstall key E may be displayed on the screen, or there may also be effected a file output to the floppy disk, etc.

When the software A is installed into other personal computer system 2b, the installer 8 of the personal computer system 2a is temporarily ended, and the installer 8 of the new personal computer system 2b is actuated. The software A does not yet exist in the new personal computer system 2b (step S0502). Accordingly, the user α selects "Installing into Other Personal Computer" (step S0512) and inputs this uninstall key E (48106929788664821625) to the installer 8 (step S0513).

The installer 8 generates and outputs a second uninstall key EE (65280317122143117342) on the basis of the uninstall key E (48106929788664821625) (step S0514).

According to a method of generating the second uninstall key EE, a hypothetical approval key with respect to the uninstall key E is generated, and the second uninstall key EE is generated as an uninstall key with respect to this hypothetical approval key. This is done by the installer 8. A hypothetical approval key generation rule conforms with an approval key generation rule in the center 15 (step S0602), and there is employed the same method of generating the second uninstall key as the uninstall key generating method shown in FIG. 21.

A random number is set in the last 6 digits among the 20 digits of the second uninstall key, and, therefore, the second uninstall keys with a content differing according to every generation thereof are generated from the same uninstall key.

The second uninstall key EE may be displayed on the screen, or there may also be effected a file output to the floppy disk, etc. The user α presents this uninstall key EE (65280317122143117342) to the center 15 and requests an approval key G for installing the software A into the personal computer system 2b (step S0601).

The center 15 analyzes the second uninstall key EE (65280317122143117342), thereby confirming that the user α has certainly executed the uninstalling of the software A installed in the past (step S0608). Then, the center 15 offers the approval key G (45820793988967993768) to the user α with no charge (step S0611).

Even if a third party β obtains the uninstall key E (48106929788664821625) when the user reinstalls the software A into other his or her personal computer, a new key EEE (65280317122143289964) including a random number different from those in the key EE as a second uninstall key is generated and outputted when the third party β tries to install the software A and therefore the decrypting key can not be generated for the third party β. Accordingly, the third party β is incapable of obtaining the approval key corresponding to the uninstall key EEE of his or her own without communicating with the center 15 and cannot illegally install this software.

In this way, the illegal installation is prevented, while the regular user is capable of reinstalling or installing the software into other personal computer system free of charge.

Further, as in the same way with the first embodiment, the approval key is calculated as a difference between the decrypting key and the approval preparatory key also in the third embodiment (step S0602). The content of the approval key changes depending on the content of the approval preparatory key. In accordance with this embodiment, the approval preparatory key is created based on the present time data (step S0515), and therefore the content of the approval key becomes different with every passage of time.

For this reason, only when using the approval preparatory key generated simultaneously with an approval preparatory key serving as a basis of generating the approval key, a correct decrypting key is created (step S0510). Accordingly, if there is employed the approval preparatory key generated at a different time from the generation time of an approval preparatory key as a basis of generating the approval key, the correct decrypting key is not calculated for the above reason. Thus, it is possible to prevent both the generation of the decrypting key when the user informs the third party of the approval key and the resultant illegal installation. Further, the illegal installation into other personal computer system by use of the original approval key can be prevented after the user has once installed the software into the personal computer system.

Fourth Embodiment

In the third embodiment discussed above, the center 15 stores all the approval preparatory keys, the uninstall keys and the approval keys with respect to each set of software as the user data. In this state, however, it follows that the center 15 stores a tremendous amount of data. Under such circumstances, a fourth embodiment of the present invention is constructed such that an approval preparatory key, which is generated at the time when the software is installed for the first time, and the data about the number of ties the software is installed, are memorized. An install situation by the user is thereby managed.

Further, in the third embodiment, the data for specifying the kind of software is not contained in the approval preparatory key, etc. For this reason, in the case of the CD-ROM 1 containing plural sets of software, the kind of the software has to be managed by other means. Then, the fourth embodiment takes such a construction as to make the approval preparatory key, etc. contain the data about the kind of software.

<Construction of Embodiment>

The specific hardware architectures of the installer 8 and the center 15 that perform the above-described control are the same as those in the first embodiment, and hence the explanations thereof will be omitted.

Figure 30:
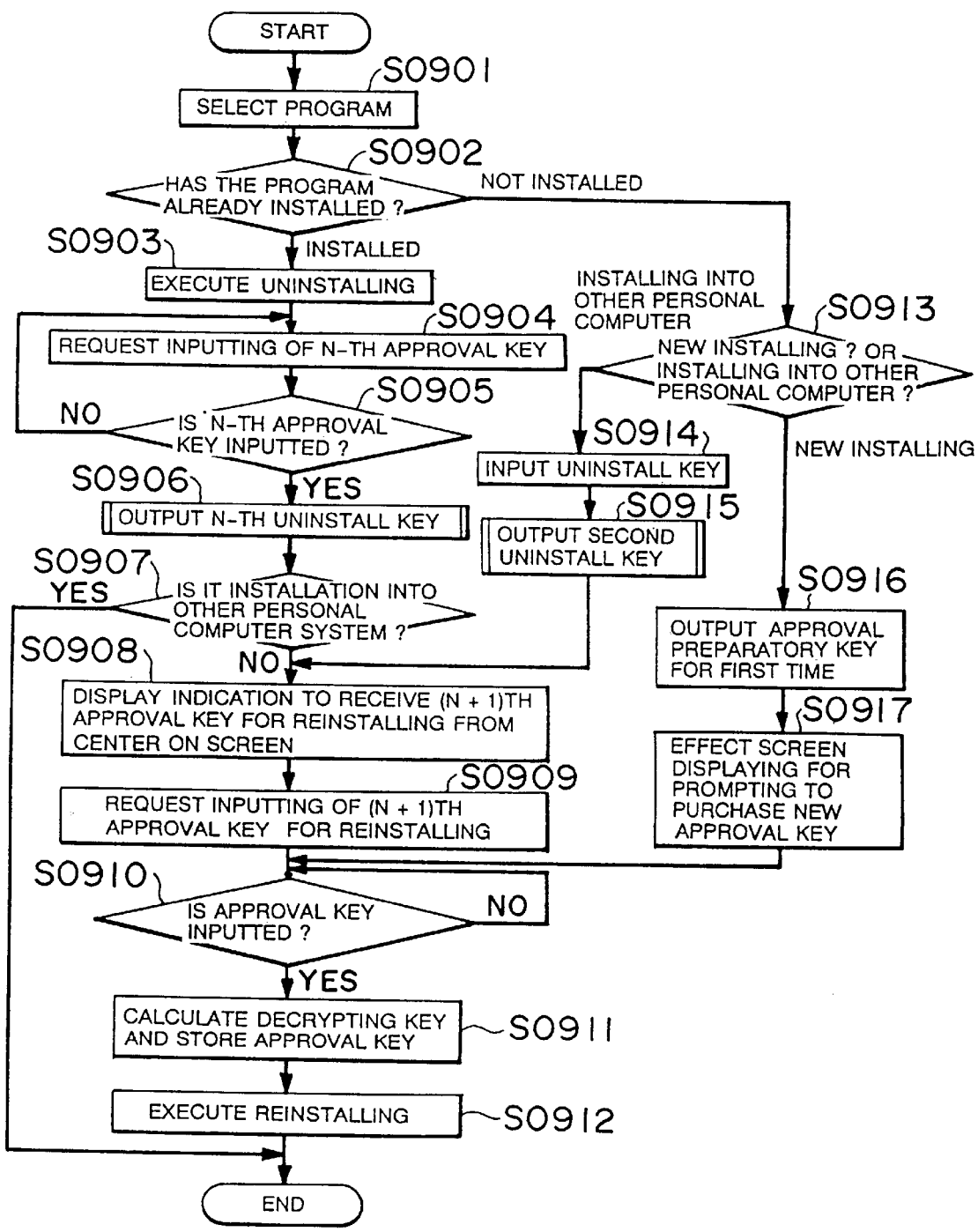
FIG. 30 is a flowchart showing processes executed in the personal computer system in a fourth embodiment of the present invention.
Figure 31:
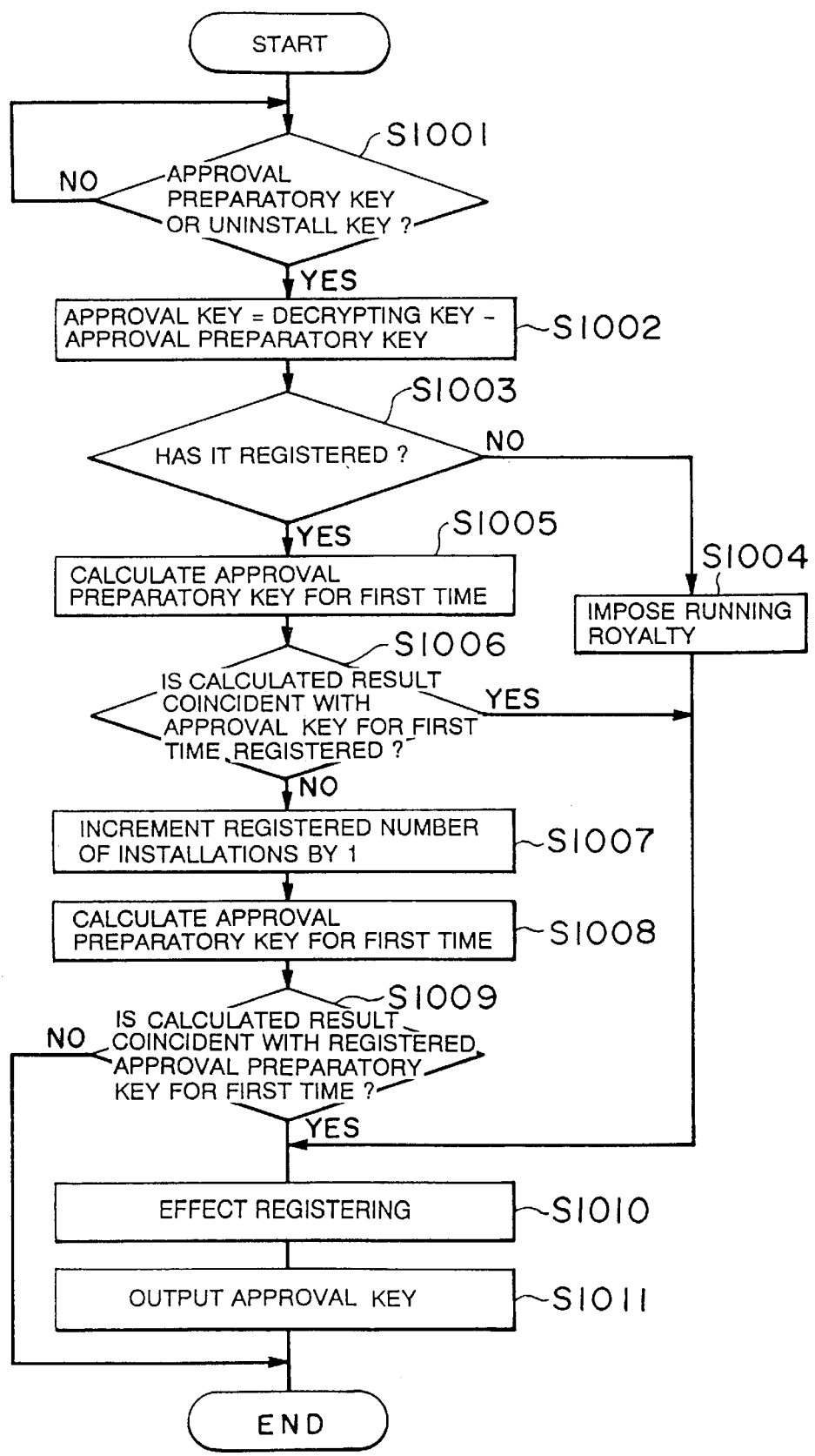
FIG. 31 is a flowchart showing processes executed in the center in the fourth embodiment of the present invention.

Given next is an explanation of the processes executed by the personal computer system 2 and the center 15 with reference to FIGS. 30 and 31. Note that each of the approval preparatory key, the approval key and the decrypting key that are employed in this embodiment is a 16-digit numeral string. Stored also in the CD-ROM 1 purchased by the user from the sales shop are plural kinds of software (for practical version) encrypted by a specified key and non-encrypted trial version software (with some functions omitted) corresponding to this practical version software. These sets of software are programs.

Decrypting the encrypted software entails the use of the same key (decrypting key) as the one used when the software encrypted. Herein, it is assumed that there is used a key all these sixteen digits of which are "0".

FIG. 30 shows processing for decrypting and installing the software executed by the installer 8 of the personal computer system 2. The processing of FIG. 30 starts with the install command inputted through the interface unit 11 after the CD-ROM 1 loaded into the CD-ROM drive unit 21. Then, the installer 8, in first step S0901, selects the practical version software to be installed from plural sets of practical version software stored in the CD-ROM 1. Alternatively, the installer 8 selects the software to be uninstalled among sets of software installed into the hard disk drive unit 9. That is, the installer 8 waits for the user to input a command for specifying the software and determines the software specified by the user as a target for processing.

In subsequent step S0902, the installer 8 checks whether or not the selected software has already been installed into the hard disk drive unit 9 of the computer system 2. If not already been installed, it can be presumed that this may be a new installation or an installation into the personal computer system 2' other than the personal computer system 2 installed originally with the software, Then, in step S0913, there is checked whether or not this is the new installation or the installation into other personal computer system 2'. This check is performed based on an input from the user.

When the user selects the new installation, in step S0916, a decrypting preparatory key defined as a first key for the first installation created based on an item of present install time data obtained from the timer 14. Characteristics required of a decrypting preparatory key generated by the installer 8 are that it indicates the number of installations, that is, indicates the kind of software and that it is generated with different contents each time the software installed. For this purpose, the installer 8 generates the approval preparatory key from the number-of-installations data, the kind-of-software data and the install date/time data. To be specific, as illustrated in FIG. 32, from the first digit of the approval preparatory key, the number-of-installations data is expressed by 3 digits, the kind-of-software data is expressed by 3 digits, the time data is expressed by 6 digits (2 digits for an hour, 2 digits for a minute, and 2 digits for a second), and a 4-digit random number is attached to the last thereof. Then, the thus generated approval preparatory key is outputted via the interface unit 11 to the floppy disk drive unit 12 or the MODEM 23 or displayed on the monitor unit 13.

In next step S0917, the installer 8 displays, on the monitor unit 13, the effect that the user is prompted to newly purchase the approval key as a second key. The processing proceeds to subsequent step S0910, wherein the installer 8 waits an input of the approval key. That is, the installer 8 waits for the user to input the approval key by use of the keyboard 22 or through the floppy disk drive unit 12 or the MODEM 23.

The installer 8, when inputting the approval key in step S0910, calculates a decrypting key from the approval key inputted in step S0910 and the approval preparatory key calculated in step S0916. Namely, a value (minimum digit value) obtained by adding the values of the same digits of the approval preparatory key and of the approval key is written to the same digit of the decrypting key which corresponds to the backward calculation of the first arithmetic operation. When the decrypting key has been calculated, this approval key is stored in the hard disk drive unit 9.

In next step S0912, the in staller 8 installs the software within the CD-ROM 1 into the hard disk drive unit 9 while the DES 7 decrypts the software. Thereafter, the installer 8 finishes the processes of FIG. 30.

On the other hand, when determining that the selected software has already been installed into the hard disk drive unit 9 in step S0902, this implies a case where the software is to be reinstalled. In this case, uninstalling the software (deleting it from the hard disk drive unit 9) has to be executed for preventing the software from being copied plural times. Accordingly, the processing proceeds to step S0903, wherein the installer 8 executes the uninstalling.

In subsequent step S0904, the installer 8 requests an input of the approval key used when the software was installed for the Nth time (last time), which is uninstalled in step S0903. In subsequent step S0905, there is a wait for inputting the approval key used when the software was installed for the Nth time (last time). When the approval key is inputted corresponding to this, the processing proceeds to step S0906.

Called in step S0906 is a subroutine (corresponding to the second arithmetic operation) (FIG. 33) for outputting the uninstall key as a third key.

Figure 33:
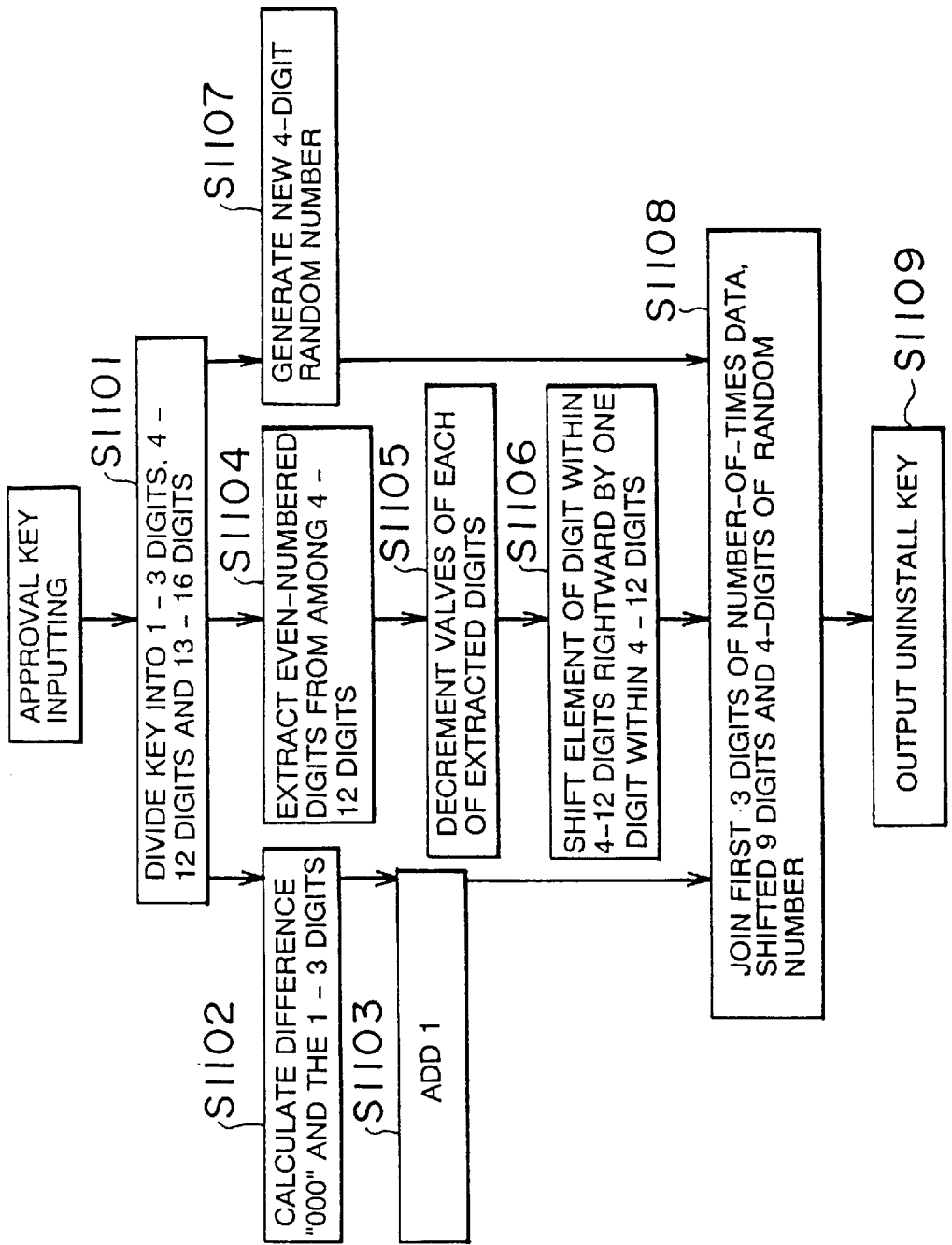
FIG. 33 is a flowchart showing subroutine for outputting an Nth uninstall key that is executed in step S0906 of FIG. 30.

In first step S1101 of the subroutine of FIG. 33, the Nth approval key inputted in step S0905 is divided into a segment of 1st through 3rd digits, a segment of fourth to 12th digits and a segment of 13th to 16th digits.

Then, with respect to the 1st through 3rd digits, a difference (10's compliment) between a value of each digit and "0" is calculated in step S1102, and 1 is added to a thus calculated result in step S1103.

Next, with respect to the 4th through 12th digits, only even-numbered digits (odd-numbered digits in the whole key) among them are extracted in step S1104, and values of the extracted even-numbered digits are decremented by 1 (set to "9" in the case of "0") in step S1105. Subsequently, in step S1106, all the elements of the 4th to 12th digits are shifted by one digit rightward (toward the last digit). The element of the 12th digit is, however, shifted to the 4th digit.

Next, with respect to the 13th through 16th digits, in step S1107, a 4-digit random number is newly generated.

In step S1108, a creation of the uninstall key consisting of totally 16 digits is completed by combining a value of the 1st through 3rd digits that is obtained as a result of step S1103, a value of the 4th through 12th digits that is obtained as a result of step S1106 and a value of the 13th through 16th digits that is obtained as a result of step S1107. In next step S1109, the thus created uninstall key is outputted via the interface unit 11 to the floppy disk drive unit 12 or the MODEM 23 or displayed on the monitor unit 13. Thereafter, this uninstall key subroutine is finished, and the processing returns to the main routine of FIG. 30.

In step S0907 of FIG. 30, there is checked whether or not uninstalling of this time is for reinstalling into other personal computer system 2'. Note that this check is done based on an input from the user. If the user selects the installation into other personal computer system 2', the installer 8 finishes the relevant processing as it is.

Whereas if the user inputs such an effect that the installation is not the one into other personal computer system 2', this can be determined as a case of reinstalling into this personal computer system 2. Then, the installer 8, when the processing proceeds to step S0908, displays, on the monitor unit 13, the effect that the user is prompted to receive the approval key for the ((N+1)th) reinstallation from the center 15. Subsequently, in step S0909, there is displayed a request for inputting the approval key for the ((N+1)th) reinstallation. Then, in step S09109, inputting the approval key for the ((N+1)th) reinstallation is waited. When the approval key is inputted in step S0910, the decrypting key is calculated in step S0911 from the uninstall key calculated in step S0906 and the approval key inputted in step S0910. Namely, a value (minimum digit value) obtained by adding the values of the same digits of the approval preparatory key and of the approval key is written to the same digit of the decrypting key which corresponds to the backward calculation of the first arithmetic operation. When the decrypting key has been calculated, the approval key is stored in the hard disk drive unit 9.

In next step S0912, the installer 8 installs the software within the CD-ROM 1 into the hard disk drive unit 9 while the DES 7 decrypts the software. Thereafter, the installer 8 finishes the processes of FIG. 30.

Given next is an explanation of the control in a case where the installation into other personal computer system 2' is selected in step S0907, and, thereafter, the processes of FIG. 30 are executed in other personal computer system 2'. In this instance, the user selects the installation into other personal computer system 2' in step S0913. In this case, the processing goes to step S0914.

Inputted in this step S0914 is the uninstall key outputted by executing the process of step S0906 in the personal computer system 2 into which the relevant software has been initially installed and from which the software has been uninstalled. Corresponding to this, the user inputs the uninstall key. In this instance, the subroutine (FIG. 22) for outputting the second install key is executed in subsequent step S0915. The specific contents of the second uninstall key output subroutine of FIG. 22 are the same as those in the third embodiment, and hence the explanation thereof will be omitted.

After the processing returns from the second uninstall key output subroutine, the processing proceeds to step S0908. In following steps inclusive of this step S0908, there are performed the same processes as those in the case of the reinstallation into the same personal computer sy stem 2.

As a result of executing the above processes, a relationship between th e decrypting key, the approval preparatory key or the uninstall key and the approval key in the case of the same user installing the same software plural times goes as shown in Table 3. This Table 3 shows an example where the software marked with a numeral 50 is installed first time at 12 h 34' 56".

TABLE 3

| | 0000000000000000 | |
|---|---|---|
| Decrypting Key | Approval Prep./Key Uninstall Key (issued by installer) | Approval Key (issued by center) |
| 1st Install | 0010501234567910 | 0090509876543190 |
| 2nd Install | 0024040886649713 | 0086060224461397 |
| 3rd Install | 0036695921434508 | 0074415189676502 |

FIG. 31 is a flowchart showing the processes for calculating the approval key and imposing a running royalty, which are to be executed by the center 15. A premise for executing the processes of FIG. 31 is that the data memory unit 18 of the center stores the user data as shown in Table 4. That is, the data memory unit 18 stores a number of user's bank account, the number of installations of the software and the approval preparatory key when the software installed for the first time according to every user purchasing the approval key of each software.

TABLE 4

| User Name/Number of Bank Account | Number of Inst. | Approval Preparatory Key for First Time (issued by Installer) |
|---|---|---|
| Userα oo☐ | 5 | 0010501234567910 |
| Userβ ∆o☐ | 2 | 0013212210309876 |

In first step S1001 of FIG. 31, the center 15 waits inputting of the approval preparatory key (or the uninstall key). That is, the center 15 waits for the user to notify the approval preparatory key (or the uninstall key) through a telephone, etc. or to transmit the approval preparatory key (or the uninstall key) online through the communications using the MODEM 23.

In next step S1002, the center 15 calculates the approval key from the decrypting key and the approval preparatory key (or the uninstall key). Namely, a value of a difference (10's compliment) obtained by subtracting the value of each digit of the approval preparatory key (or-the uninstall key) from the value of the same digit of the decrypting key is written to the same digit of the approval key, which corresponds to the first arithmetic operation In next step S1003, the center 15 checks whether or not the user data about this user with respect to this software is registered. If not registered, it is determined that the installation is made for the first time, and a running royalty is imposed thereon. More specifically, there is made a procedure of withdrawing a vending fee (a running royalty of the software) for the approval key from the user's bank account or from the credit company. When completing the procedure for the withdrawing, the user data (containing the approval key and the approval preparatory key) are registered in the data memory unit 18 (step S1010), and this approval key is outputted (step S1011).

When determining that the user data has been registered in step S1003, the approval preparatory key for the first time is calculated from the number of installations that has been registered in the data memory unit 18 and the approval preparatory key (or the uninstall key) inputted in step S1001. That is, a backward calculation of arithmetic creating a uninstall key shown in FIG. 33 is executed with respect to the approval key or the uninstall key (there is not known which key has been inputted at this point of time) inputted in step S1001. Thereafter a value of a difference (10's compliment) obtained by subtracting a value of each digit of a result of the backward calculation described above from a value of the same digit of the decrypting key is written to a same digit of a data string. When the number of installations that has been registered in the data memory unit 18 is 2 or larger, these arithmetic operations are alternately repeated with respect to the result of the calculation. That is, the backward calculation of arithmetic criating an uninstall key and the calculation of the substracting from the decrypting key are repeated the same number of times as the number of installations that has been registered in the data memory unit 18.

Checked next in step S1006 is whether or not the result of calculation (first 12 digits) in step S1005 coincides with the approval preparatory key (first 12 digits) for the first time that has been registered in the data memory unit 18. If the two values are coincident with each other as a result of this check, it can be determined that this is reinstalling into the same personal computer system 2. Hence, the number of installations, which has been registered in the data memory unit 18, is updated by adding 1 thereto and thus registered therein (step S1010) without imposing the running royalty (step 11004) in order to issue the approval key free of charge, and the approval key calculated in step S1002 is outputted as it is (step S1011).

In contrast with this, when it is determined that the two values are not coincident in step S1006, 1 is added to the number of installations that has been registered in the data memory unit 18.

In subsequent step S1008, the approval preparatory key for the first time is calculated from the approval preparatory key (or the uninstall key) inputted in step S1001 and the numerical value calculated in step S1007. The specific arithmetic content for performing this calculation is the same as the arithmetic in step S1005. However, the number of repetitions conforms with the numerical value calculated in step S1007.

Checked next in step S1009 is whether or not the result of calculation (first 12 digits) in step S1008 coincides with the approval preparatory key (first 12 digits) for the first time that has been registered in the data memory unit 18. This is a check to determine whether or not the approval preparatory key or the uninstall key inputted in step S1001 is defined as a second uninstall key generated in step S0915.

If the two values are coincident with each other as a result of this check, it can be determined that the second uninstall key has been inputted in step S100. In this case, the approval key should be issued free of charge, and, therefore, the number of installations, which has been registered in the data memory unit 18, is updated by adding 2 thereto and thus registered therein (step S1010) without imposing the running royalty (step S1004), and the approval key calculated in step S1002 is outputted as it is (step S1011).

Whereas if the two values are not coincident in step S1009, it can be determined that the request for the approval key is given with respect to the software already installed but not yet uninstalled. Hence, this processing comes to an end as it is without outputting the approval key (step S1011).

Thus, in accordance with this embodiment, the center 15 manages the names of the users and the number of installations at the time. Accordingly, if the third party β pretends to be a regular user α trying to obtain the approval key without cost, and even if the third party presents, e.g., the third uninstall key to the center 15, the center 15 can recognize that the third approval key has already been issued to the user regular α (step S1009). Therefore, the center 15 can easily detect that the request from the third party β is illegal.

In accordance with this fourth embodiment, as shown in Table 4, the center 15 may simply manage the number of installations of the registered user but does not have to manage the history of the approval preparatory key, the approval key and the uninstall key created in the past as shown in Table 2 in the third embodiment. The management table is thereby simplified.

<Operation of Embodiment>

Explanatory examples which follow are based on such a premise that the decrypting key, the approval preparatory key or the uninstall key and the approval key are set as shown in Table 3.

(First Case)

Figure 34:
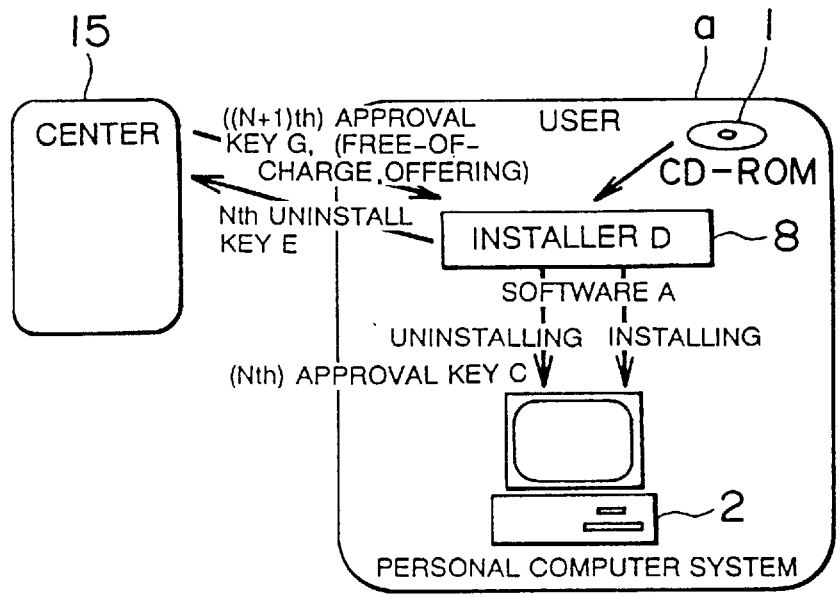
FIG. 34 is an explanatory diagram showing (first case of) the operation of the fourth embodiment of the present invention.

Given herein is an example where the regular user α uses the installer 8 to reinstall the software A within the CD-ROM 1 into the personal computer system 2 for the (N+1)th time (see FIG. 34).

When the user α selects the software A as an install target software by starting up the installer 8 (step S0901), the installer 8 confirms whether or not the software A has already been installed into the personal computer system 2 by retrieving the hard disk drive unit (step S0902).

It is determined as a result of the confirmation that the software A has already been installed, and hence uninstalling (erasing) of the software A which is installed in the past is started (step S0903). After the uninstalling has been finished, the software A comes to be nonexistent in the personal computer system 2 of the user α.

Figure 35:
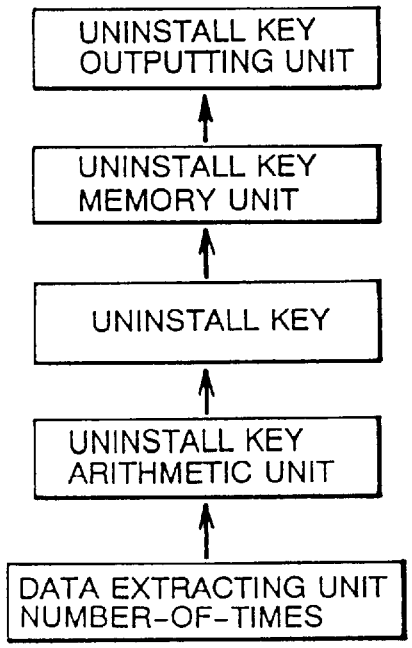
FIG. 35 is a functional block diagram showing functions when outputting the uninstall key in the first case.
Figure 36:
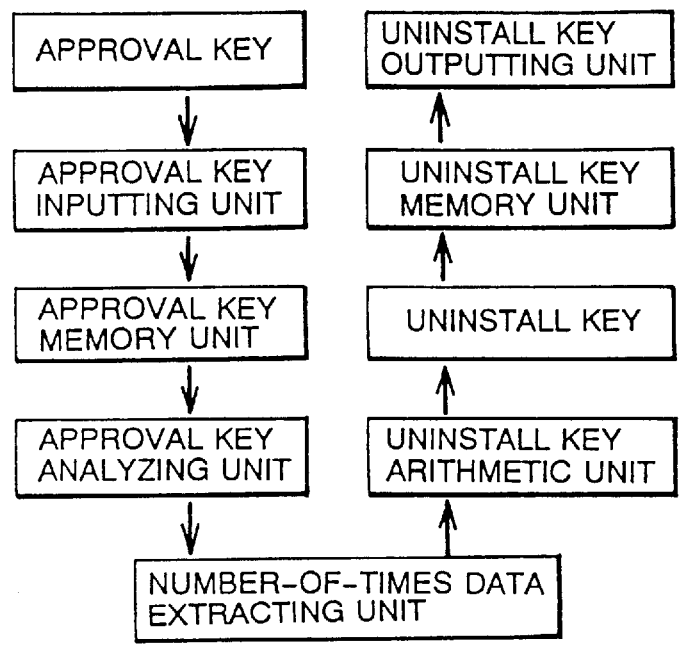
FIG. 36 is a functional block diagram showing functions when generating the uninstall key in the first case.

The installer 8, after finishing the uninstalling, generates and outputs the Nth uninstall key E on the basis of the approval key C used when the software A is installed for the Nth time (see FIGS. 35 and 36). The uninstall key E may be displayed on the screen, or there may also be effected a file output to the floppy disk, etc.

The user α presents this uninstall key E to the center 15 and requests the approval key G for the (N+1)th reinstalling.

The center 15 analyzes the uninstall key E, thereby confirming that the user α has certainly executed the uninstalling of the software A installed N times in the past. Then, the center 15 offers the ((N+1)th) approval key G to the user α with no charge (step S1011).

(Second Case)

Figure 37:
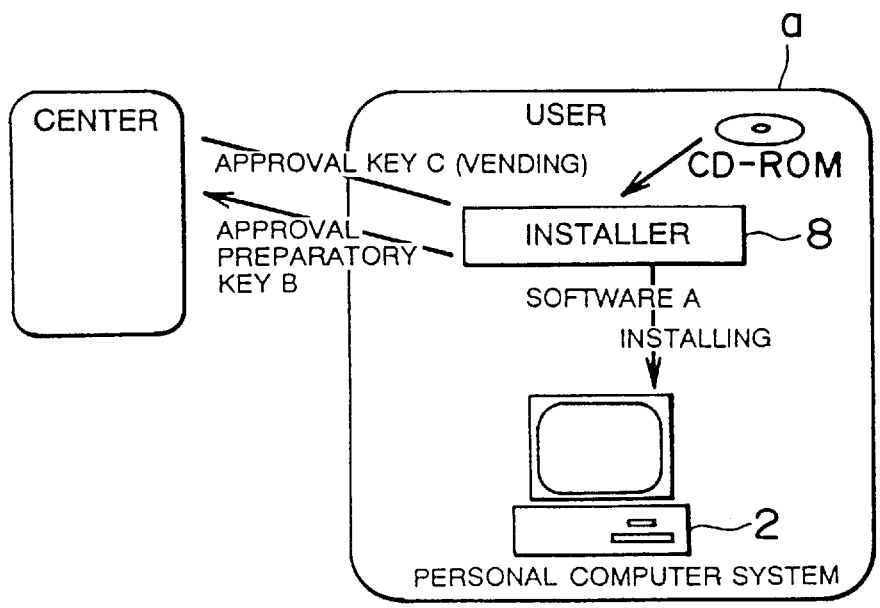
FIG. 37 is an explanatory diagram showing (second case of) the operation of the third embodiment of the present invention.

There will be described an example where the regular user α uses the installer 8 to install the software A within the CD-ROM 1 into the personal computer system 2 for the first time (See FIG. 37).

The user α selects the software A as an install target software by actuating the installer 8 (step S0901). The installer 8 retrieves the hard disk unit 9, thereby confirming whether or not the software A was installed in the past into the personal computer system 2 (step S0902).

The user α did not install the software A in the past, and hence the installer 8 makes the user α select "New Installing" or "Installing into Other Personal Computer System" according to a desire of the user α (step S0913). If the user α selects the new installing, the approval preparatory key B for the first time is outputted, and a message saying that "Newly purchase the approval key" is displayed on the screen, thus prompting the user α to purchase the approval key C.

The approval preparatory key B includes, as described above, data about the title number of the software and the number of installations, and the random number generated each time is written to the remaining digits. With this arrangement, the approval preparatory key when a plurality of users performs the first installations does not overlap.

The user α communicates with the center 15 and informs the center 15 of the approval preparatory key B. The center 15 generates the approval key C based on the approval preparatory key B (step S1002), registers the user α (step S1010) and transfers the approval key C to the user α (step s1011). Thus, the user α becomes a regular user after purchasing the approval key C.

The user α inputs the approval key C to the installer 8 (step S0910) and completes the installing operation (steps S0911, S0912)

(Third Case)

Figure 38:
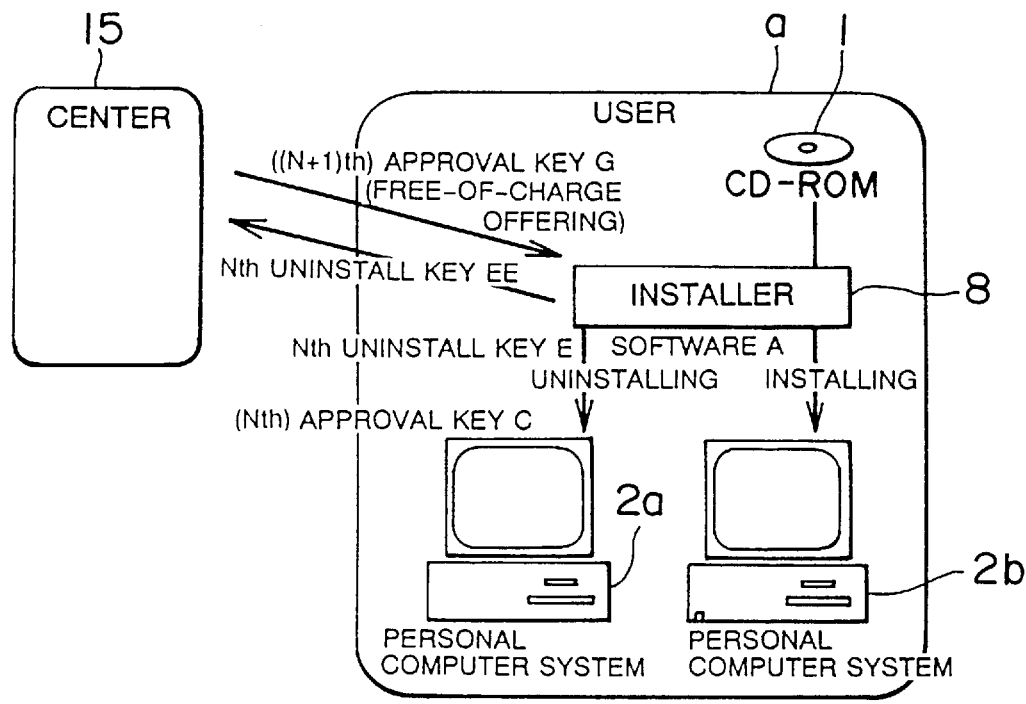
FIG. 38 is an explanatory diagram showing (third case of) the operation of the third embodiment of the present invention.
Figure 39:
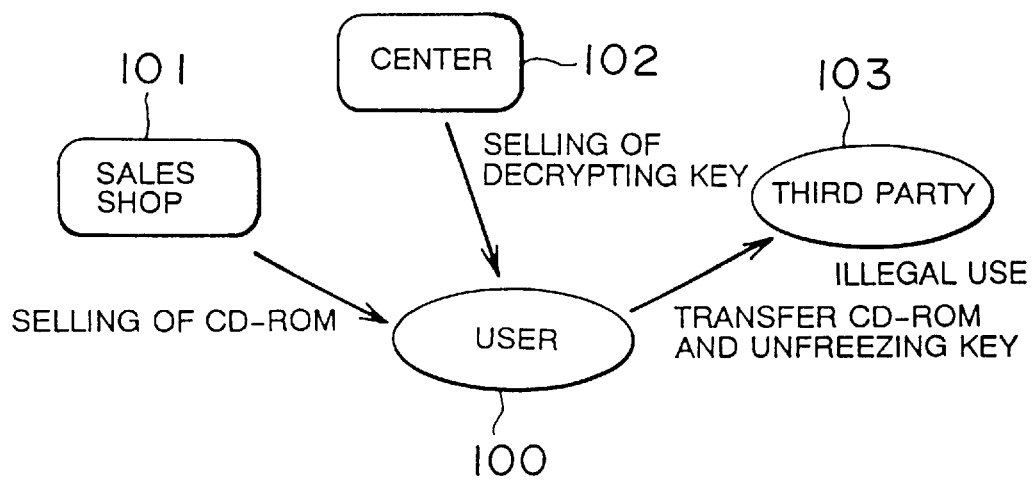
FIG. 39 is a diagram illustrating a conventional example.

Given herein is an example where the user α who had installed the software A within the CD-ROM 1 into the personal computer system 2a in the past will install the software A into the new personal computer 2b which has additionally been bought (see FIG. 38).

The user α starts up the installer 8 of the personal computer system 2a into which the software A has already been installed N times and selects the software A as an uninstall target software (step S0901). The installer 8, after finishing the uninstalling of the software A, reads the approval key C recorded in the personal computer system 2a when the software A installed last time (for the Nth time). The installer 8 then outputs the uninstall key E as a sure sign of the completion of uninstalling on the basis of the approval key C (step S0906). The uninstall key E may be displayed on the screen, or there may also be effected a file output to the floppy disk, etc.

When the software A is installed into other personal computer system 2b, the installer 8 of the personal computer system 2a is temporarily ended, but the installer 8 of the new personal computer system 2b is actuated. The software A does not yet exist in the new personal computer system 2b (step S0902). Accordingly, the user α selects "Installing into Other Personal Computer" (step S0913) and inputs this (Nth) uninstall key E to the installer 8.

The installer 8 generates and outputs the (Nth) second uninstall key EE on the basis of the uninstall key E (step S0915).

According to the method of generating the second uninstall key EE, the hypothetical approval key with respect to the uninstall key E is generated, and the second uninstall key EE is generated as an uninstall key with respect to this hypothetical approval key. This is done by the installer 8. The hypothetical approval key generation rule conforms with the approval key generation rule in the center 15 (step S1002), and there is employed the same method of generating the second uninstall key as the uninstall key generating method shown in FIG. 33.

A random number is set in the last 4 digits among the 16 digits of the second uninstall key, and, therefore, the second uninstall keys with a content differing according to every generation thereof are generated from the same sauninstall key.

The (Nth) second uninstall key EE may be displayed on the screen, or there may also be effected a file output to the floppy disk, etc. The user α presents this (Nth) second uninstall key EE to the center 15 and requests the ((N+1)th) approval key G for installing the software A into the personal computer system 2b.

The center 15 analyzes the (Nth) second uninstall key EE, thereby confirming that the user α has certainly executed the uninstalling of the software A installed in the past. Then, the center 15 offers the ((N+1)th) approval key G to the user α with no charge (step S1011).

Even if the third party β obtains the (Nth) uninstall key E when the user reinstalls the software A into other his or her personal computer, a (apparently Nth) new key EEE including a random number different from those in the key EE as a second uninstall key is generated and outputted when the third party B tries to install the software A, and therefore the decrypting key can not be generated for the third party B. Accordingly, the third party β is impossible of obtaining the approval key corresponding to the (apparently Nth) uninstall key EEE of his or her own without communicating with the center 15 and cannot illegally install this software.

In this way, the illegal installation is prevented, while the regular user is capable of reinstalling or installing the software into other personal computer system free of charge.

Further, as in the same way with the first embodiment, the approval key is calculated as a difference between the decrypting key and the approval preparatory key also in the fourth embodiment (step S1002). The content of the approval key changes depending on the content of the approval preparatory key. In accordance with this embodiment, the approval preparatory key is created based on the present time data (step S0916), and therefore the content of the approval key becomes different with every passage of time. For this reason, only when using the approval preparatory key generated simultaneously with an approval preparatory key serving as a basis of generating the approval key, a correct decrypting key is created (step S0911). Accordingly, if there is employed the approval preparatory key generated at a different time from the generation time of an approval preparatory key as a basis of generating the approval key, the correct decrypting key is not calculated for the above reason. Thus, it is possible to prevent both the generation of the approval key when the user informs the third party of the decrypting key and the resultant illegal installation. Further, the illegal installation into other personal computer system by use of the original approval key can be prevented after the user has once installed the software into the personal computer system.

As discussed above, according to the present invention, it is possible to effectively prevent the illegal use of the as-encrypted software stored in the CD-ROM. Further, when a storage element for storing the data about the installations of the past is provided, it is feasible to reissue the decrypting key in response to only a valid request for reissuing the decrypting key by discriminating a valid request for reissuing the decrypting key for the encrypted software stored in the CD-ROM from the invalid request for that.

This invention being thus described, it will be obvious that same may be varied in same way. Such variations are not to be regarded as a departure from the spirit and scope of the invention, and all such modifications as would be obvious to one skilled in the art intended to be included within the scope of the following claims.

What is claimed is:

1. A system for decrypting encrypted software including a decrypting device for decrypting the encrypted software by use of a decrypting key and a management device for managing the decryption of the software, said system comprising:

first key generating means for generating a first key based on time data in said decrypting device;

second key generating means for generating a second key by executing a direct operation according to a first function with respect to the decrypting key and the first key in said management device;

decrypting key generating means for generating the decrypting key by executing a reverse operation according to the first function with respect to the second key in said decrypting device; and decrypting means for decrypting the encrypted software by said decrypting key in said decrypting device.

2. A system for decrypting encrypted software according to claim 1, further comprising: accounting means for imposing a running royalty of the software each instance said second key generating means generates the second key in said management device.

3. A system for decrypting encrypted software according to claim 2, further comprising:

installing means, provided in said decrypting device, for installing the software decrypted by said decrypting means into a storage device for an apparatus using the software connected to said decrypting device.

4. A system for decrypting encrypted software according to claim 3, wherein said accounting means does not impose the running royalty of the software even if said second key generating means regenerates the second key for decrypting the same software in case the software once installed in said storage device is deleted from said storage device.

5. A system for decrypting encrypted software according to claim 4, further comprising:

uninstalling means for deleting the software installed in said storage device, said uninstalling means provided in said decypting device.

6. A system for decrypting encrypted software according to claim 5, further comprising:

third key generating means for generating a third key for proving, in case said uninstalling means deletes the software from said storage device, this effect, said third key generating means provided in said decrypting device.

7. A system for decrypting encrypted software according to claim 6, wherein said third key generating means generates the third key by performing a second arithmetic operation on the second key.

8. A system for decrypting encrypted software according to claim 7, wherein in case said third key generating means generates the third key, said second key generating means generates the second key by performing the first arithmetic operation on the decrypting key and the third key, and said decrypting key generating means generates the decrypting key by performing a backward calculation of the first arithmetic operation on the third key and the second key.

9. A system for decrypting encrypted software according to claim 8, wherein said management device further includes a memory for memorizing all of the first key and the third key which have undergone the first arithmetic operation by said second key generating means, and said second key generating means does not perform the first arithmetic operation on the first key or the third key that is memorized in said storage means.

10. A system for decrypting encrypted software according to claim 8, wherein said management device further includes a memory for memorizing the first key which have undergone the first arithmetic operation by said second key generating means and the number of instances with which the second key is generated, and said second key generating means executes the first and second arithmetic operations the above number of instances on the first key stored in said storage means, and generates the second key only in the case the third key coincides with the result of the execution.

11. A system for decrypting encrypted software according to claim 6 wherein the third key contains data about the number of instances with which the software is deleted from said storage means.

12. A system for decrypting encrypted software according to claim 4, further comprising:

means for setting the software installed in said storage device in an unusable state, said setting means provided in said decrypting device.

13. A system for decrypting encrypted software according to claim 1, further comprising:

installing means, provided in said decrypting device, for installing the software decrypted by said decrypting means into a storage device for an apparatus using the software connected to said decrypting device.

14. A system for decrypting encrypted software according to claim 1, wherein the first arithmetic operation is an arithmetic operation of calcutating a difference between the first key and the decrypting key.

15. A system for decrypting encrypted software according to claim 1, wherein the software is a program to be executed by a computer.

16. A system for decrypting encrypted software according to claim 15, wherein said decrypting device is incorporated into a computer for executing the program.

17. A decrypting device coupled to a management unit and for decrypting encrypted software, comprising:

first key generating means for generating a first key based on time data;

decrypting key generating means for generating a decrypting key by executing a reverse operation according to the first function with respect to the second key if the management unit receiving the first key generates the second key by executing a direct operation according to a first function with respect to the decrypting key and the first key; and decrypting means for decrypting the encrypted software using the decrypting key.

18. A management device for outputting a decrypting key for decrypting encrypted software to a decrypting device, said management device comprising:

means for receiving a first key generated based on time data in said decrypting device;

second key generating means for generating a second key by executing a direct operation according to a first function with respect to the decrypting key and the first key; and transmitting means for transmitting the second key to said decrypting device.

19. A system for decrypting encrypted software comprising:
- a decrypting device to decrypt encrypted software, comprising a first key generation unit for generating a first key based on time data corresponding to an instance of installation of said encrypted software; and
- a management device in communication with the decrypting device and managing the decryption of said encrypted software, comprising a second key generation unit generating a second key by subtracting values of each digit of said first key from corresponding values of each digit of a decrypting key, said decrypting device further comprising:
  - a decrypting key generating unit to generate the decrypting key by adding corresponding values of each digit of said first key and said second key in said decrypting device, and
  - a decrypting unit in communication with the management device and for decrypting the encrypted software by use of the decrypting key.

20. A decrypting device for decrypting encrypted software, comprising:
- a first key generating unit to generate a first key based on time data corresponding to an instance of installation of said encrypted software;
- a management unit to generate a second key by subtracting corresponding values of each digit of said first key and a decrypting key; and
- a decrypting key generating unit, in communication with the first key generating unit and the management unit, to generate the decrypting key by adding values of each digit of said first key and corresponding values of said second key, said decrypting device to decrypt the encrypted software by use of said decrypting key.

21. A management device for outputting a decrypting key used to decrypt encrypted software, said management device comprising:
- a first key generation device to generate a first key based on time data;
- a second key generating unit to generate a second key by subtracting corresponding values of each digit of said first key and a decrypting key; and
- a transmitting device, in communication with the first key generation device and the second key generating unit, to transmit the second key to a decrypting device.

22. A method of decrypting encrypted software, said method comprising the steps of:
- generating a first key based on time data;
- generating a second key by subtracting corresponding values of each digit of said first key and a decrypting key;
- generating a decrypting key by adding values of each digit of said first key and corresponding values of said second key; and
- decrypting the encrypted software by use of said decrypting key.

23. A method for outputting a decrypting key used to decrypt encrypted software, said method comprising the steps of:
- generating a first key based on time data;
- generating a second key by subtracting corresponding values of each digit of said first key and a decrypting key; and
- transmitting the second key to a decrypting device.

24. A system for decrypting encrypted software upon initial software installation comprising:
- a decrypting device decrypting the encrypted software and comprising:
  - an approval preparatory key generating unit to generate an approval preparatory key based on time data of said software installation,
  - a decrypting key generating unit to generate a decrypting key by adding corresponding values of each digit of said approval preparatory key and an approval key, and
  - a decrypting unit to decrypt the encrypted software by use of the decrypting key; and
- a management device in communication with said decrypting device and managing the decryption of said encrypted software, said management device comprising an approval key generation unit to generate the approval key based on the approval preparatory key.

25. A system for decrypting encrypted software upon software reinstallation comprising:
- a decrypting device to decrypt encrypted software comprising:
  - an approval preparatory key generating unit to generate an approval preparatory key based on time data of said software reinstallation,
  - a decrypting key generating unit for generating a new decrypting key adding corresponding values of each digit of said approval preparatory key and said approval key in said decrypting device; and
  - a decrypting unit for decrypting the encrypted software by use of the new decrypting key; and
- a management device in communication with said decrypting device and managing the decryption of said encrypted software, said management device comprising an approval key generation unit to generate an approval key by subtracting corresponding values of each digit of said approval preparatory key from the corresponding values of each digit of a previously stored decrypting key.

26. A system for decrypting encrypted software upon initial software installation comprising:
- a decrypting device to generate an approval preparatory key based on time data of said software installation, to generate a decrypting key by adding corresponding values of each digit of said approval preparatory key and an approval key, and to decrypt the encrypted software by use of the decrypting key; and
- a management device in communication with said decrypting device and managing the decryption of said encrypted software, said management device to generate the approval key based on the approval preparatory key.

27. A method for decrypting encrypted software upon initial software installation comprising the steps of:
- generating, by a decrypting device, a decrypting key by adding corresponding values of each digit of said approval preparatory key and an approval key, and decrypting the encrypted software by use of the decrypting key; and
- managing, by a management device, the decryption of said encrypted software, and generating the approval key based on the approval preparatory key, said approval preparatory key generated based on time data.

* * * * *